(12) United States Patent
Nakamura et al.

(10) Patent No.: US 11,550,671 B2
(45) Date of Patent: Jan. 10, 2023

(54) BACKUP MANAGEMENT DEVICE, BACKUP MANAGEMENT METHOD, AND INFORMATION PROCESSING SYSTEM

(71) Applicant: FUJITSU LIMITED, Kawasaki (JP)

(72) Inventors: Takuji Nakamura, Kawasaki (JP); Junichi Matsuda, Kawasaki (JP); Keiji Miyauchi, Yokohama (JP); Akihiro Doshita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/399,097

(22) Filed: Aug. 11, 2021

(65) Prior Publication Data
US 2022/0091945 A1 Mar. 24, 2022

(30) Foreign Application Priority Data
Sep. 18, 2020 (JP) .............................. JP2020-157608

(51) Int. Cl.
*G06F 11/14* (2006.01)
*G06F 21/31* (2013.01)

(52) U.S. Cl.
CPC ...... *G06F 11/1469* (2013.01); *G06F 11/1451* (2013.01); *G06F 11/1461* (2013.01); *G06F 11/1464* (2013.01); *G06F 21/31* (2013.01); *G06F 2201/80* (2013.01)

(58) Field of Classification Search
CPC .. G06F 11/14; G06F 11/1451; G06F 11/1461; G06F 11/1464; G06F 11/1469
See application file for complete search history.

(56) References Cited

U.S. PATENT DOCUMENTS

| | | | | |
|---|---|---|---|---|
| 7,330,947 B2* | 2/2008 | Hasegawa | ........... | G06F 11/1458 714/E11.12 |
| 7,409,705 B1* | 8/2008 | Ueda | ..................... | H04L 9/3228 713/182 |
| 7,849,323 B2* | 12/2010 | Field | ..................... | H04L 63/083 713/184 |
| 7,945,948 B2* | 5/2011 | Ueda | ....................... | G11C 7/24 713/168 |

(Continued)

FOREIGN PATENT DOCUMENTS

| JP | 2014-229306 A | 12/2014 |
|---|---|---|
| JP | 2016-009299 A | 1/2016 |

(Continued)

*Primary Examiner* — Kamini B Patel
(74) *Attorney, Agent, or Firm* — Fujitsu Patent Center

(57) ABSTRACT

A backup management device includes a database and a processor. The database is configured to store configuration information of physical resource including a physical storage device, configuration information of virtual resource including a virtual storage device, and relationship information of the virtual resource and the physical resource. The processor is configured to generate, when the virtual storage device is provided to a user, backup information related to backup control of the physical storage device associated with the virtual storage device based on information stored in the database. The processor is configured to perform backup of the virtual storage device by copying a physical storage device associated with the virtual storage device to another physical storage device based on the generated backup information.

6 Claims, 21 Drawing Sheets

(56) References Cited

U.S. PATENT DOCUMENTS

| | | | | |
|---|---|---|---|---|
| 7,984,491 | B2 * | 7/2011 | Ueda | G06F 21/31 |
| | | | | 713/168 |
| 8,140,854 | B2 * | 3/2012 | Ogawa | G06F 21/36 |
| | | | | 726/28 |
| 8,769,224 | B1 * | 7/2014 | Raj | G06F 11/1464 |
| | | | | 711/E12.103 |
| 9,619,350 | B1 * | 4/2017 | Ambat | G06F 11/1435 |
| 9,836,357 | B1 * | 12/2017 | Wilk | G06F 11/1464 |
| 10,387,263 | B2 * | 8/2019 | Karinta | H04L 67/1097 |
| 11,294,776 | B2 * | 4/2022 | Kvache | H04L 63/102 |
| 2014/0136485 | A1 | 5/2014 | Miyoshi et al. | |
| 2015/0312242 | A1 | 10/2015 | Ogawa | |
| 2016/0202923 | A1 | 7/2016 | Liu et al. | |

FOREIGN PATENT DOCUMENTS

| | | |
|---|---|---|
| JP | 2016-524752 A | 8/2016 |
| WO | 2013/035517 A1 | 3/2013 |

* cited by examiner

FIG. 2

ACCOUNT DATABASE

ACCOUNT DATA
- ACCOUNT ID
  - ACCOUNT ID
  - PASSWORD

Key JOINED

AUTHENTICATION DATABASE

AUTHENTICATION DATA
- ACCOUNT ID
- AUTHENTICATION INFORMATION (Token)
- AUTHENTICATION INFORMATION CREATION DATE AND TIME Key-CONVERSION JOINED

VIRTUAL SERVER CONFIGURATION DATABASE

VIRTUAL SERVER DATA
- PROJECT ID
- VIRTUAL SERVER NAME
- VIRTUAL MACHINE SPECIFICATION (CPU/MEMORY)
- VIRTUAL DISK No.
- ⋮
- DEPLOYMENT DESTINATION PHYSICAL SERVER NAME

Key JOINED / Key-CONVERSION JOINED

PHYSICAL CONFIGURATION DATABASE

PHYSICAL SERVER DATA
- PHYSICAL SERVER NAME
- CONNECTION DESTINATION PHYSICAL STORAGE NAME

PHYSICAL SERVER DATA
- PHYSICAL STORAGE NAME
- PHYSICAL DISK No. (BACKUP SOURCE)
- PHYSICAL DISK No. (FIRST GENERATION)
- PHYSICAL DISK No. (SECOND GENERATION)
- ⋮
- BACKUP DESTINATION PHYSICAL DISK No.
- ⋮
- BACKUP DESTINATION PHYSICAL DISK No.

Key JOINED (DERIVATION RELATIONSHIP)

BACKUP INFORMATION DATABASE

BACKUP INFORMATION DATA
- PROJECT ID
- VIRTUAL SERVER NAME
- VIRTUAL DISK No.
- PHYSICAL STORAGE NAME
- PHYSICAL DISK No. (BACKUP SOURCE)
- BACKUP DESTINATION PHYSICAL DISK No. (FIRST GENERATION)
- BACKUP DESTINATION PHYSICAL DISK No. (SECOND GENERATION)
- BACKUP EXECUTION TIME (FIRST GENERATION)*
- BACKUP EXECUTION TIME (SECOND GENERATION)*

UPDATE AT VIRTUAL SERVER PROVISION

UPDATE AT PHYSICAL CONFIGURATION CHANGE (NEW INSTALLATION/ADDITION, OR THE LIKE)

AUTOMATICALLY DERIVE TOGETHER

*BACKUP EXECUTION TIME IS UPDATED AT ACTUAL PROCESSING EXECUTION TIMING

FIG. 3

| PROJECT ID | VIRTUAL SERVER NAME | VIRTUAL DISK No. | PHYSICAL STORAGE NAME | PHYSICAL DISK No. (BACKUP SOURCE) | BACKUP DESTINATION PHYSICAL DISK No. (FIRST GENERATION) | BACKUP EXECUTION TIME (FIRST GENERATION) | BACKUP DESTINATION PHYSICAL DISK No. (SECOND GENERATION) | BACKUP EXECUTION TIME (SECOND GENERATION) |
|---|---|---|---|---|---|---|---|---|
| PID001 | VM1 | 1100 | ST1 | 100 | 3000 | mm-dd-YYYY h:m:s | 4000 | mm-dd-YYYY h:m:s |
| PID001 | VM2 | 1110 | ST1 | 110 | 3100 | mm-dd-YYYY h:m:s | 4100 | mm-dd-YYYY h:m:s |
| PID001 | VM3 | 2200 | ST1 | 200 | 3200 | mm-dd-YYYY h:m:s | 4200 | mm-dd-YYYY h:m:s |
| PID001 | VM4 | 1100 | ST2 | 100 | 3000 | mm-dd-YYYY h:m:s | 3100 | mm-dd-YYYY h:m:s |
| .. | .. | .. | .. | .. | .. | .. | .. | .. |
| PID999 | VM1 | 1100 | ST3 | 100 | 3000 | mm-dd-YYYY h:m:s | 3001 | mm-dd-YYYY h:m:s |
| PID999 | VM2 | 2200 | ST3 | 200 | 3100 | mm-dd-YYYY h:m:s | 3200 | mm-dd-YYYY h:m:s |
| .. | .. | .. | .. | .. | .. | .. | .. | .. |

FIG. 4

| ACCOUNT | PASSWORD |
|---|---|
| UID001-01 | Passwd01 |
| UID001-02 | Passwd02 |
| UID001-03 | Passwd03 |
| UID999-01 | Passwd9991 |
| UID999-02 | Passwd9992 |
| UID999-03 | Passwd9993 |
| ⋮ | ⋮ |

FIG. 5

| ACCOUNT | AUTHENTICATION INFORMATION | AUTHENTICATION INFORMATION CREATION DATE AND TIME |
|---|---|---|
| UID001-01 | zmnaBOw1tG | 06-15-2020 18:04:49 |
| UID001-02 | WEKAJ4VTzV | 06-18-2020 12:38:43 |
| UID001-03 | 0qQlfEPCuB | 06-19-2020 09:30:34 |
| ⋮ | ⋮ | ⋮ |
| UID999-01 | 6ZE2KKPBKw | 06-19-2020 09:30:34 |
| UID999-02 | azdzuRUKZk | 06-19-2020 09:30:34 |
| UID999-03 | ph_GlWIprq | 06-19-2020 09:30:34 |
| ⋮ | ⋮ | ⋮ |

BACKUP MANAGEMENT DEVICE, BACKUP MANAGEMENT METHOD, AND INFORMATION PROCESSING SYSTEM

CROSS-REFERENCE TO RELATED APPLICATION

This application is based upon and claims the benefit of priority of the prior Japanese Patent Application No. 2020-157608, filed on Sep. 18, 2020, the entire contents of which are incorporated herein by reference.

FIELD

The embodiment discussed herein is related to a backup management device, a backup management method, and an information processing system.

BACKGROUND

FIG. 15 illustrates a backup system that backs up data of a storage device connected to a server. As illustrated in FIG. 15, a backup system 80 includes four servers 81 represented by servers A to C and a server M, and two storage devices 82 represented by a storage device #1 and a storage device #2. The four servers 81 and the two storage devices 82 are connected by a management network 83. The servers A to C, the storage device #1 and the storage device #2 are connected by a storage area network (SAN) 84. Note that, the servers A to C, the storage device #1, and the storage device #2 may be connected by a network other than the SAN.

The server M is a management server 81 that manages the backup system 80. The servers A to C are backup target servers 81 for which data is backed up. The storage device 82 includes disks 85 represented by disks A to C. The disk A is a business use disk 85 and a backup disk 85 of the server A, the disk B is a business use disk 85 of the server B, and the disk C is a business use disk 85 of the server C. The unshaded disk 85 is the business use disk 85, and the shaded disk 85 is the backup disk 85.

The backup system 80 implements backup by controlling copy of data in the business use disk 85 to the backup disk 85 by using storage backup management software represented by a manager 86 and an agent 87. The manager 86 is installed on the management server 81. The manager 86 is responsible for overall management of configuration management, setting, and control of the servers A to C, the storage device #1, and the storage device #2. The agent 87 for issuing a backup control instruction is installed in each of the backup target servers 81. The agent 87 provides a backup setting and control interface for its own server 81. The storage device 82 executes a function to copy the data held by the storage device 82 to another disk resource according to the instructions of the manager 86 and the agent 87 to implement the backup.

A backup processing sequence of an agent trigger is as follows. The agent 87 receives backup settings and an execution operation and requests the manager 86 for backup (t91). The manager 86 processes the request of the agent 87 (t92) and instructs the storage device 82 to execute backup (t93). Then, the storage device 82 performs backup settings and executes the backup (t94).

FIG. 16 is a diagram illustrating a backup system on a cloud platform. On the cloud platform, physical resources such as a physical server 91 and a physical storage 92 are virtualized into virtual resources such as virtual servers 94 and virtual disks 95 using virtualization software 93, and the virtual resources are aggregated in one pool. The virtual resources aggregated in the pool are managed by a management server 96 and allocated to each user. The backup virtual disks 95 are similarly allocated from the pool, and the virtualization software 93 performs copy processing among the virtual disks 95 in response to a backup request. Note that, since the virtual disks 95 aggregated in the pool are network-coupled, network communication is also performed in the copy processing among the virtual disks 95. Furthermore, the agent 87 illustrated in FIG. 15 needs to be installed in each virtual server 94.

Note that, as an existing technology for backup, there is a file management system that can efficiently perform backup by adopting a form in which a meta database of a virtual file system is used from a backup processing side as well.

Furthermore, as an existing technology for backup, there is a device for backing up an application running over a plurality of virtual machines. The device executes, in response to the need to back up an application, a first set of scripts used to bring the plurality of virtual machines to work together into a ready state prior to the backup. The device then triggers a backup operation of at least one backup agent that manages the plurality of virtual machines in response to full execution of the first set of scripts. The backup operation involves the backup agent locating data associated with the application on each virtual machine. The device then executes a second set of scripts used to restore operation of the plurality of virtual machines in response to completion of the backup operation.

Furthermore, as an existing technology for user authentication, there is a user authentication technology for effectively preventing an unauthorized access by a third party to a system. In this user authentication technology, an information communication terminal assigns a number or the like constituting a token code generated in time synchronization with an authentication system side to each element constituting a password derivation pattern of a user. Furthermore, the information communication terminal displays, on a user interface, a password table to which randomly generated numbers and the like are assigned to other elements. The user refers to the password table, extracts the numbers and the like assigned to each element constituting his/her password derivation pattern and inputs the numbers and the like as a password, and the authentication system performs authentication determination for the input password on the basis of the generated time-synchronized token code.

Furthermore, as an existing technology for user authentication, there is a single sign-on system that enables a terminal user to implement a server that provides various functions and single sign-on by a single login operation to a terminal without separately installing an authentication server. In this single sign-on system, an information processing device receives a login operation for its own device, sends an authentication linkage request to a permitting server, and sends a second authentication request to a service provision server due to a receipt of a first authentication request from the permitting server. Then, the information processing device sends a third authentication request to the service provision server due to a response to the second authentication request by the service provision server, and receives a redirect instruction to the permitting server including an authorization code from the service provision server that has responded to the third authentication request. Then, the information processing device receives a response to the authentication linkage request including an authentication token from the permitting server that has generated the authentication token using the authorization code included in the redirect.

International Publication Pamphlet No. WO 2013/035517, Japanese National Publication of International Patent Application No. 2016-524752, Japanese Laid-open Patent Publication No. 2014-229306, and Japanese Laid-open Patent Publication No. 2016-9299 are disclosed as related art.

SUMMARY

According to an aspect of the embodiments, a backup management device includes a database configured to store configuration information of physical resource including a physical storage device, configuration information of virtual resource including a virtual storage device, and relationship information of the virtual resource and the physical resource; and a processor configured to generate, when the virtual storage device is provided to a user, backup information related to backup control of the physical storage device associated with the virtual storage device based on information stored in the database, and perform backup of the virtual storage device by copying a physical storage device associated with the virtual storage device to another physical storage device based on the generated backup information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a database;

FIG. 3 is a diagram illustrating an example of backup information data;

FIG. 4 is a diagram illustrating an example of account data;

FIG. 5 is a diagram illustrating an example of authentication data;

DESCRIPTION OF EMBODIMENTS

Figure 16:
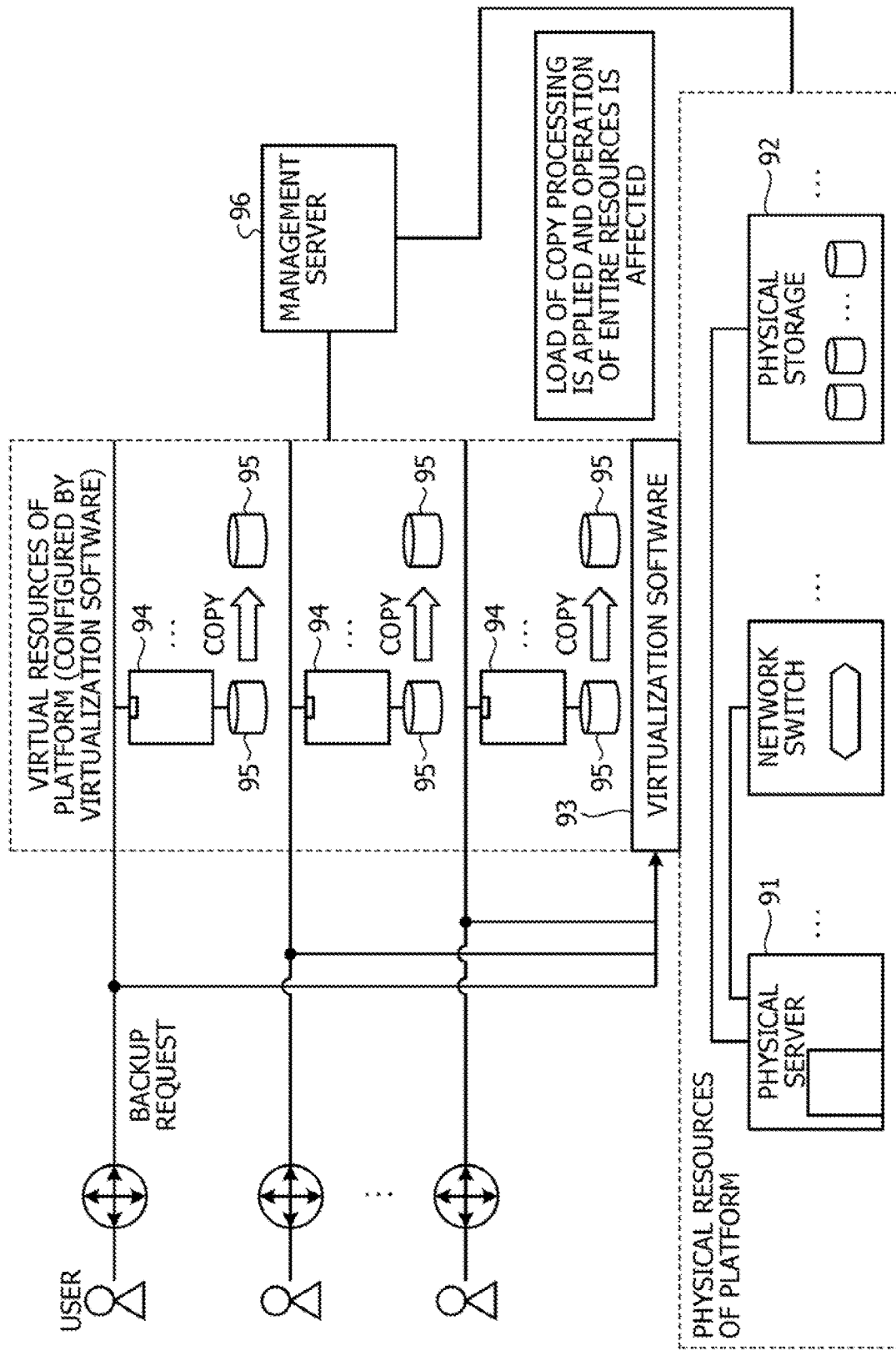
FIG. 16 is a diagram illustrating a backup system on a cloud platform.

In FIG. 16, in a case of performing copy processing between the pooled virtual storages 95, there is a problem that a load of the copy processing is applied to the virtualization software 93 including network communication, which causes performance deterioration of other virtual resources. Furthermore, since the agent 87 needs to be installed in each virtual server 94, it is costly to purchase and manage the agent 87.

One aspect of the present embodiments is to prevent performance deterioration of other virtual resources in backing up a virtual resource.

Hereinafter, embodiments of the backup management device, the backup management method, and the information processing system disclosed in the present application will be described in detail with reference to the drawings. Note that, the present embodiments do not limit the technology disclosed.

Embodiments

Figure 1:
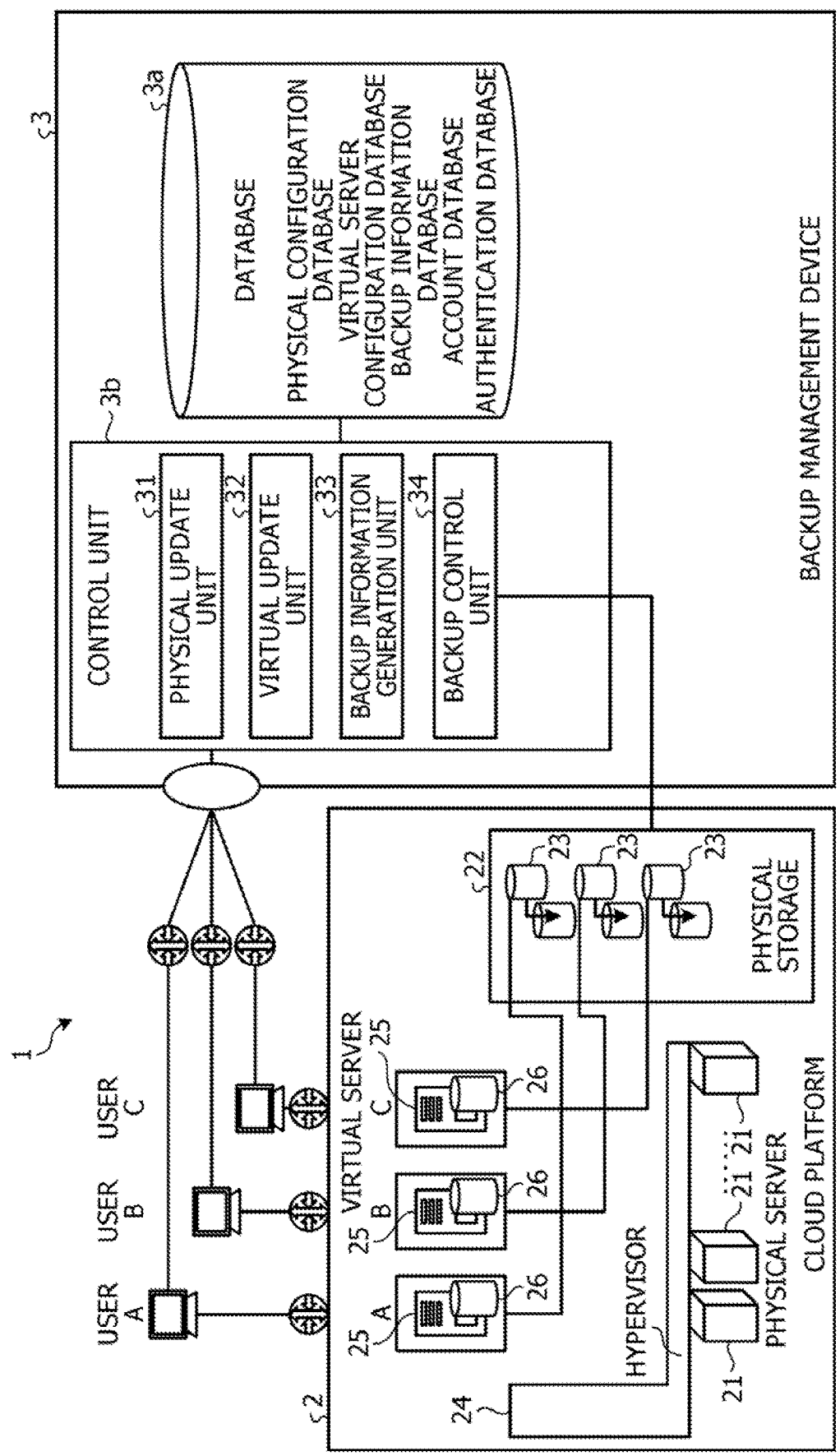
FIG. 1 is a diagram illustrating a configuration of an information processing system according to an embodiment.

First, a configuration of an information processing system according to an embodiment will be described. FIG. 1 is a diagram illustrating a configuration of the information processing system according to the embodiment. As illustrated in FIG. 1, the information processing system 1 according to the embodiment includes a cloud platform 2 and a backup management device 3.

The cloud platform 2 provides users with virtual resources. The cloud platform 2 has physical resources such as a plurality of physical servers 21 and a plurality of physical storages 22. Note that, FIG. 1 illustrates only one physical storage 22 for convenience of explanation. The physical storage 22 is a non-volatile storage device. The physical storage 22 includes a plurality of physical disks 23. The physical disk 23 is a storage device including a non-volatile storage medium such as a magnetic disk or a NAND flash memory.

The physical resources are virtualized into virtual resources by a hypervisor 24. The virtual resources are provided to users. For example, each of a user A, a user B, and a user C is provided with a virtual server 25 and a virtual disk 26. Note that, each user is provided with a plurality of virtual servers 25 and virtual disks 26. The virtual disk 26 is associated with the physical disk 23 and is backed up by the backup management device 3. Note that, in the following description, the user may indicate a user terminal (for example, a personal computer, a mobile terminal such as a smartphone or a tablet, or the like).

The backup management device 3 backs up the virtual disk 26 of the cloud platform 2 by backing up the physical disk 23 associated with the virtual disk 26. The backup management device 3 includes a database 3a and a control unit 3b.

The database 3a stores data used for the backup of the virtual disk 26. The database 3a includes a physical configuration database, a virtual server configuration database, a backup information database, an account database, and an authentication database.

The physical configuration database stores data related to the physical server 21 included in the cloud platform 2 as physical server data, and stores data related to the physical storage 22 included in the cloud platform 2 as physical storage data. The virtual server configuration database stores data related to the virtual server 25 as virtual server data. The backup information database stores information related to the backup of the virtual disk 26 as backup information data. The account database stores data related to a user's account as account data. The authentication database stores data related to authentication of backup, restore, and information display related to the backup (hereinafter simply referred to as "information display") as authentication data.

FIG. 2 is a diagram illustrating an example of a database 3a. As illustrated in FIG. 2, the physical server data includes a physical server name, a connection destination physical storage name, and the like. The physical server name is a name for identifying the physical server 21. The connection destination physical storage name is a name indicating the physical storage 22 to be connected. The physical storage data includes a physical storage name, a physical disk number (No.), and a plurality of backup destination physical disk numbers (Nos.) for a plurality of generations. The physical storage name is a name that identifies the physical storage 22. The physical disk No. Is a name that identifies the physical disk 23 included in the physical storage 22. The physical disk No. indicates the backup source physical disk 23. The backup destination physical disk No. indicates a backup destination of the physical disk 23. The connection destination physical storage name of the physical server data and the physical storage name of the physical storage data are key-joined. The physical disk No. is associated with a plurality of the backup destination physical disk Nos.

The virtual server data includes a project identifier (ID), a virtual server name, a virtual machine specification, a virtual disk No., and a deployment destination physical server name. The project ID is an identifier that identifies a user's project. The virtual server name is a name that identifies the virtual server 25. The virtual machine specification indicates the specifications of a central processing unit (CPU) and a memory of the virtual server 25. The virtual disk No. is a number that identifies the virtual disk 26 used by the virtual server 25. The deployment destination physical server name is an identifier that identifies the physical server 21 to which the virtual server 25 is deployed. The virtual disk No. is associated with the physical disk No. of the physical storage data (key-conversion joined). The deployment destination physical server name is key-joined with the physical server name of the physical server data.

The backup information data includes a project ID, a virtual server name, a virtual disk No., a physical storage name, a physical disk No., a backup destination physical disk No., and a backup execution time. The backup destination physical disk No. and the backup execution time have a first generation and a second generation. The backup destination physical disk No. and the backup execution time may have three or more generations.

The project ID is an identifier that identifies a project that uses the virtual disk 26 to be backed up. The virtual server name is a name that identifies the virtual server 25 that uses the virtual disk 26 to be backed up. The virtual disk No. is a number that identifies the virtual disk 26 to be backed up. The physical storage name is a name that identifies the physical storage 22 having the physical disk 23 associated with the virtual disk 26 to be backed up. The physical disk No. is a number that identifies the physical disk 23 associated with the virtual disk 26 to be backed up, that is, the backup source. The backup destination physical disk No. is a number that identifies the backup destination physical disk 23. The backup execution time is a time when the backup has been performed.

The physical configuration database is updated when a physical configuration is changed, such as new installation or addition of the physical server 21, the physical storage 22, or the like. The virtual server configuration database is updated when, for example, the virtual server 25 is provided. The backup information database is derived from the physical configuration database and the virtual server configuration database when the virtual server 25 is provided.

FIG. 3 is a diagram illustrating an example of the backup information data. As illustrated in FIG. 3, for example, a virtual server "VM1" and a virtual disk "1100" are assigned to a project identified with "PID001". The virtual disk "1100" is associated with a physical disk "100" of a physical storage "ST1". The physical disk "100" has been backed up to a physical disk "3000" as the first generation at "YYYY-mm-dd h:m:s", and has been backed up to a physical disk "4000" as the second generation at "YYYY-mm-dd h:m:s".

The account data includes an account ID and a password. The account ID is an identifier that identifies a user who uses the cloud platform 2. The password is a character string used to authenticate the user who uses the cloud platform 2. FIG. 4 is a diagram illustrating an example of the account data. As illustrated in FIG. 4, for example, the password of an account ID "UID001-01" is "Passwd01".

The authentication data includes an account ID, authentication information, and authentication information creation data and time. The account ID is an identifier that identifies an account used for backup, restore, and information display. The authentication information is information used for authentication confirmation of backup, restore, and information display. The authentication information is called a token. The authentication information creation date and time is date and time when the authentication information has been created. FIG. 5 is a diagram illustrating an example of the authentication data. As illustrated in FIG. 5, for example, the authentication information of the account ID "UID001-01" is "zmnaBOw1tG" and has been created at "2020-06-15 18:04:49". Note that, a method of using the authentication data will be described below.

Returning to FIG. 1, the control unit 3b includes a physical update unit 31, a virtual update unit 32, a backup information generation unit 33, and a backup control unit 34.

The physical update unit 31 updates the physical configuration database at the timing when the physical server 21 and the physical storage 22 of the cloud platform 2 are installed, added, or the like. The virtual update unit 32 updates the virtual server configuration database at the timing when the virtual server 25 is provided to the user.

The backup information generation unit 33 automatically derives the backup information database from the physical configuration database and the virtual server configuration database at the timing when the virtual server 25 is provided to the user together with the virtual disk 26.

The backup control unit 34 controls the backup, restore, and information display of the virtual disk 26 by using the backup information database, the account database, and the authentication database.

Figure 6:
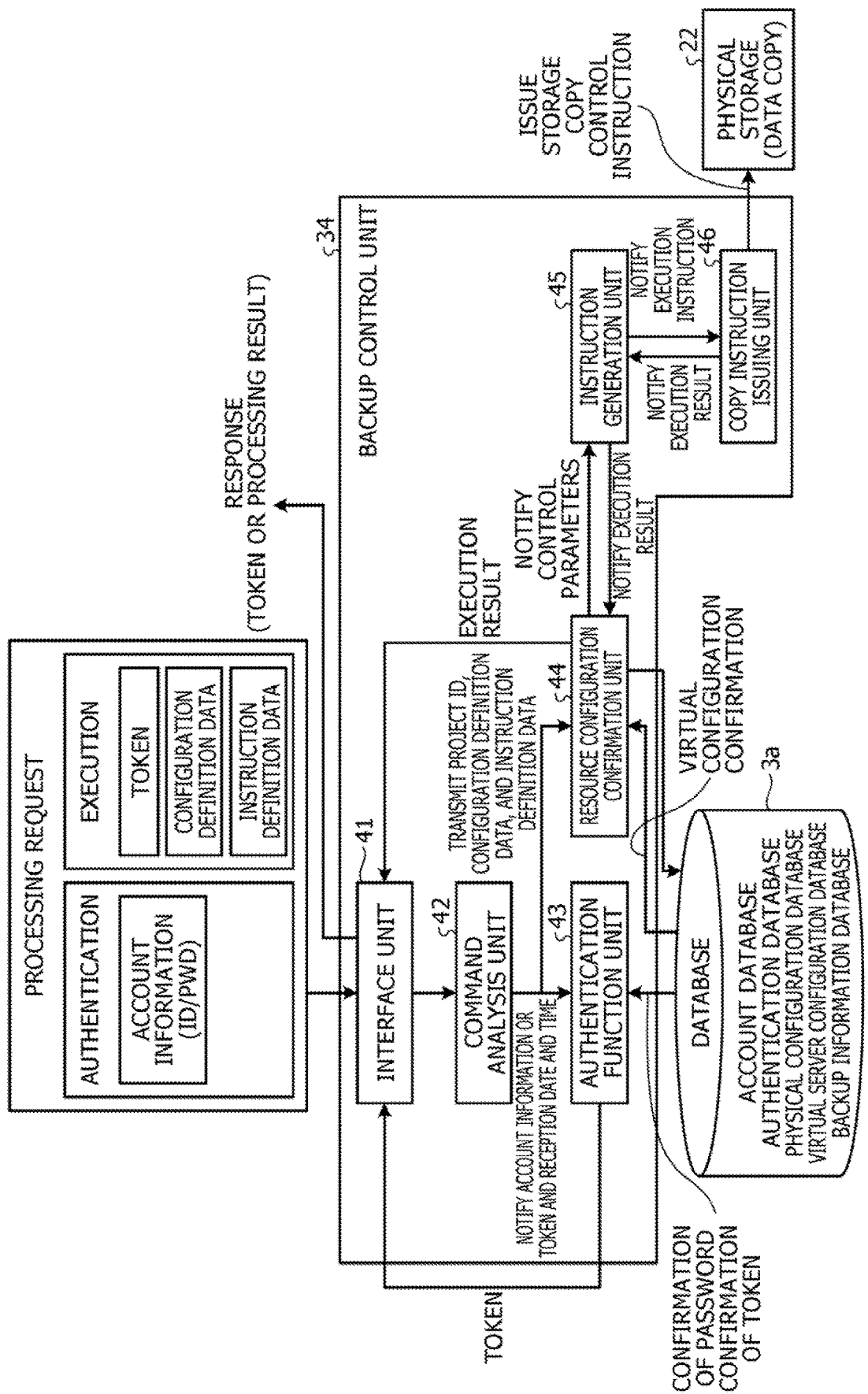
FIG. 6 is a diagram illustrating a functional configuration of a backup control unit.

FIG. 6 is a diagram illustrating a functional configuration of the backup control unit 34. As illustrated in FIG. 6, the backup control unit 34 includes an interface unit 41, a command analysis unit 42, an authentication function unit 43, a resource configuration confirmation unit 44, an instruction generation unit 45, and a copy instruction issuing unit 46.

The interface unit 41 receives a processing request from the user and transmits the received processing request to the command analysis unit 42. Furthermore, the interface unit 41 transmits a processing result of the processing request to the user. For example, the interface unit 41 receives an authentication request including account information from the user, and transmits a token to the user when the authentication has been successful. The account information includes an ID (account ID) and a password (PW). Furthermore, the interface unit 41 receives an execution request including the token, configuration definition data, and instruction definition data from the user, and transmits a processing result of the execution request to the user. The configuration definition data includes the virtual server name and the virtual disk No., and the instruction definition data includes the backup, restore, or information display as the execution instruction and includes generation designation. Note that, in the case of the authentication request, the execution instruction is authentication.

The command analysis unit 42 receives the processing request from the interface unit 41 and analyzes the processing request. In the case where the processing request is the authentication request, the command analysis unit 42 requests the authentication function unit 43 to authenticate the user together with the account information. In the case where the processing request is the execution request, the command analysis unit 42 requests the authentication function unit 43 to confirm the authentication of the execution request together with the token and processing request reception date and time. Then, when the authentication confirmation has been successful, the command analysis unit 42 receives the account ID associated with the token from the authentication function unit 43. Then, the command analysis unit 42 converts the account ID into the project ID, and transmits the project ID, the configuration definition data, and the instruction definition data to the resource configuration confirmation unit 44.

The authentication function unit 43 authenticates the user and confirms the authentication of the execution request. When the command analysis unit 42 requests user authentication together with the account information, the authentication function unit 43 authenticates the user on the basis of the account database. Then, when the authentication has been successful, the authentication function unit 43 creates a token with a random number of alphanumeric characters and symbols, and stores the created token and creation date and time of the token in association with the account ID in the authentication database. Then, the authentication function unit 43 transmits the token to the user as a response via the interface unit 41.

When the command analysis unit 42 requests authentication confirmation of the execution request together with the token and processing request reception date and time, the authentication function unit 43 determines whether the token exists in the authentication database. Then, in a case where the token exists in the authentication database, the authentication function unit 43 determines whether the processing request reception date and time has passed a predetermined time (for example, five minutes) or more from the authentication information creation date and time associated with the token. Then, in a case where the predetermined time has not passed, the authentication function unit 43 determines that the token is valid, acquires the account ID associated with the token from the authentication database, and transmits the account ID to the command analysis unit 42. On the other hand, in a case where the predetermined time or more has been passed, the authentication function unit 43 determines that the token has expired, and notifies the user that the token has expired as a response via the interface unit 41.

The resource configuration confirmation unit 44 performs virtual configuration confirmation for the user's virtual server 25 and virtual disk 26 on the basis of the project ID and the configuration definition data received from the command analysis unit 42. Here, the virtual configuration confirmation is to confirm whether the project ID, the virtual server name, and the virtual disk No. are associated with one another by referring to the backup information database. Then, when the virtual configuration confirmation has been successful, the resource configuration confirmation unit 44 determines whether the execution instruction included in the instruction definition data is the backup or restore.

Then, in a case of the backup or restore, the resource configuration confirmation unit 44 extracts information such as the physical storage 22 and the physical disk 23 needed for the backup or restore from the backup information database, and creates control parameters for copy. Then, the resource configuration confirmation unit 44 notifies the instruction generation unit 45 of the control parameters. Then, the resource configuration confirmation unit 44 receives an execution result from the instruction generation unit 45 and transmits the execution result to the user as a response via the interface unit 41. Furthermore, the resource configuration confirmation unit 44 stores instruction execution time as backup execution time in the backup information database.

Meanwhile, in a case where the execution instruction is the information display, the resource configuration confirmation unit 44 extracts the backup execution time of the virtual server 25 and the virtual disk 26 specified in the configuration definition data from the backup information database, and transmits the backup execution time to the user via the interface unit 41.

The instruction generation unit 45 creates an instruction statement for executing the backup or restore based on the control parameters received from the resource configuration confirmation unit 44, and notifies the copy instruction issuing unit 46 that issues the instruction to the physical storage 22. Here, the instruction statement is a software command for executing copy processing of the physical storage 22. Furthermore, the instruction generation unit 45 receives an instruction execution result from the copy instruction issuing unit 46 and notifies the resource configuration confirmation unit 44 of the execution result.

The copy instruction issuing unit 46 executes copy control of the physical storage 22 by issuing a storage copy control instruction to the target physical storage 22 on the basis of the instruction statement received from the instruction generation unit 45, and notifies the instruction generation unit 45 of an execution result for the instruction.

Figure 7A:
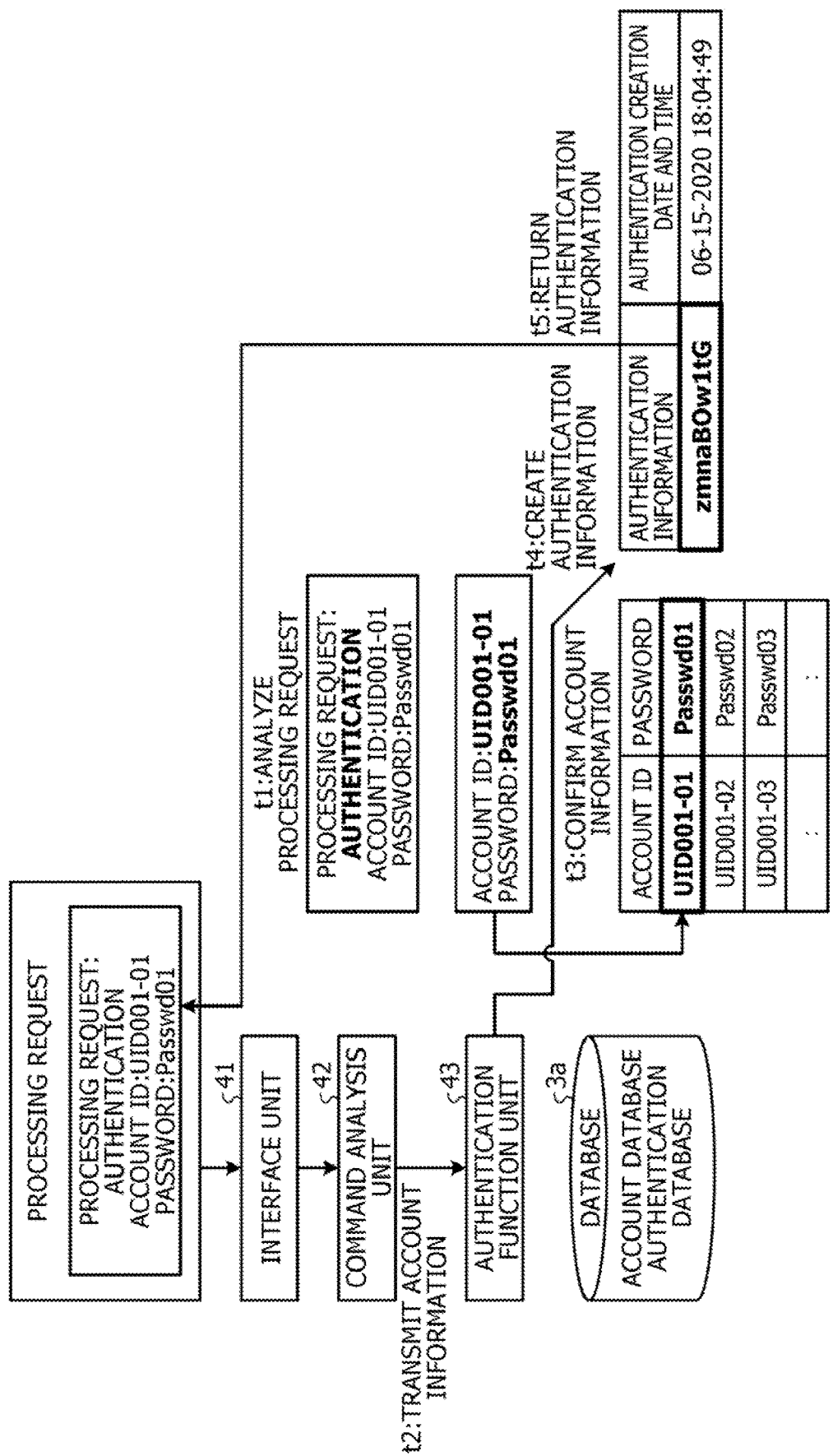
FIG. 7A is a diagram illustrating an authentication operation by the backup control unit.

Next, an operation of the backup control unit 34 will be described with reference to FIGS. 7A to 7D. FIG. 7A is a diagram illustrating an authentication operation by the backup control unit 34. As illustrated in FIG. 7A, the interface unit 41 receives the processing request together with the account ID and the password and transmits the received information to the command analysis unit 42. Then, the command analysis unit 42 analyzes the processing request (t) and specifies that the processing request is the authentication request. Then, the command analysis unit 42 transmits the account information to the authentication function unit 43 (t2).

Then, the authentication function unit 43 refers to the account database and confirms the account information (t3). In FIG. 7A, the account database contains the pair of the account ID "UID001-01" and the password "Passwd01" received together with the processing request, so the authentication is successful. Then, the authentication function unit 43 creates the authentication information (t4) and registers the authentication information together with the authentication information creation date and time in association with the account ID in the authentication database. Then, the authentication function unit 43 returns the authentication information via the interface unit 41 (t5).

Figure 7B:
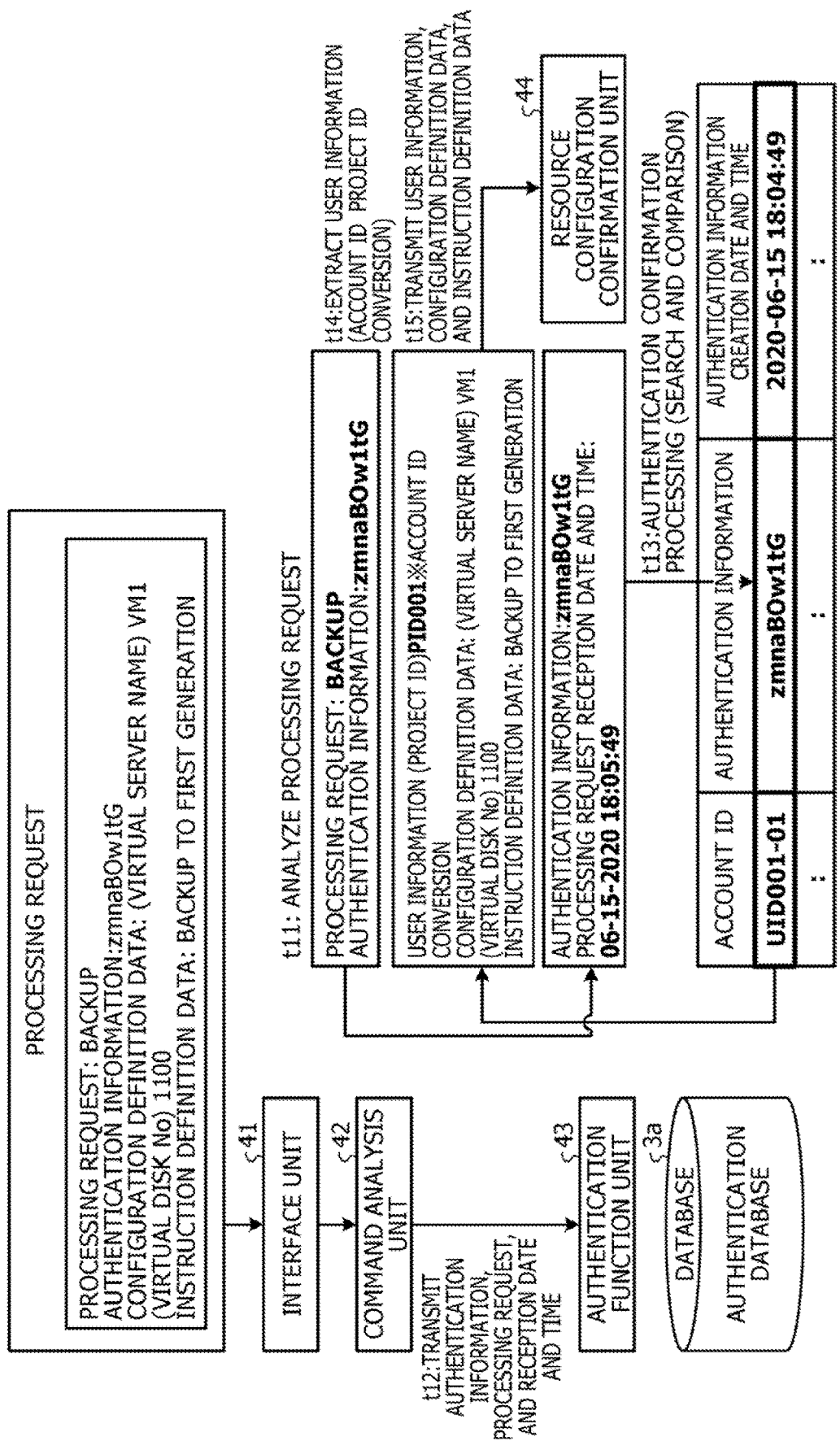
FIG. 7B is a diagram illustrating an authentication confirmation operation by the backup control unit.

FIG. 7B is a diagram illustrating an authentication confirmation operation by the backup control unit 34. As illustrated in FIG. 7B, the interface unit 41 receives the processing request together with the authentication information, the configuration definition data, and the instruction definition data, and transmits the received information to the command analysis unit 42. For example, "zmnaBOw1tG" is specified in the authentication information, the virtual server name "VM1" and the virtual disk No. "1100" are specified in the configuration definition data, and "backup to the first generation" is specified in the instruction definition data.

The command analysis unit 42 analyzes the processing request (t11) and specifies that the processing request is the backup request. Then, the command analysis unit 42 transmits the authentication information and the processing request reception date and time to the authentication function unit 43 (t12).

The authentication function unit 43 performs authentication confirmation processing by search and comparison (t13). That is, the authentication function unit 43 searches the authentication database for the authentication information creation date and time associated with the authentication information, and compares the searched authentication information creation date and time with the processing request reception date and time. Then, the authentication function unit 43 determines that the authentication confirmation has been successful in a case where the processing request reception date and time has not passed a predetermined time or more from the authentication information creation date and time, acquires the account ID associated with the authentication information from the authentication database, and returns the account ID to the command analysis unit 42. The command analysis unit 42 extracts user information using the account ID (t14). The command analysis unit 42 extracts the user information by converting the account ID into the project ID. Then, the command analysis unit 42 transmits the user information, the configuration definition data, and the instruction definition data to the resource configuration confirmation unit 44 (t15).

In FIG. 75, the authentication information creation date and time associated with the authentication information "zmnaBOw1tG" Is "2020-06-15 18:04:49", and the processing request reception date and time is "2020-06-15 18:05: 49". Therefore, the authentication confirmation is successful. Then, the account ID "UID001-01" associated with the authentication information "zmnaBOw1tG" is extracted from the authentication database, and the extracted account ID "UID001-01" is converted into the project ID (for example, "PID001"). Then, the project ID is extracted as the user information.

Figure 7C:
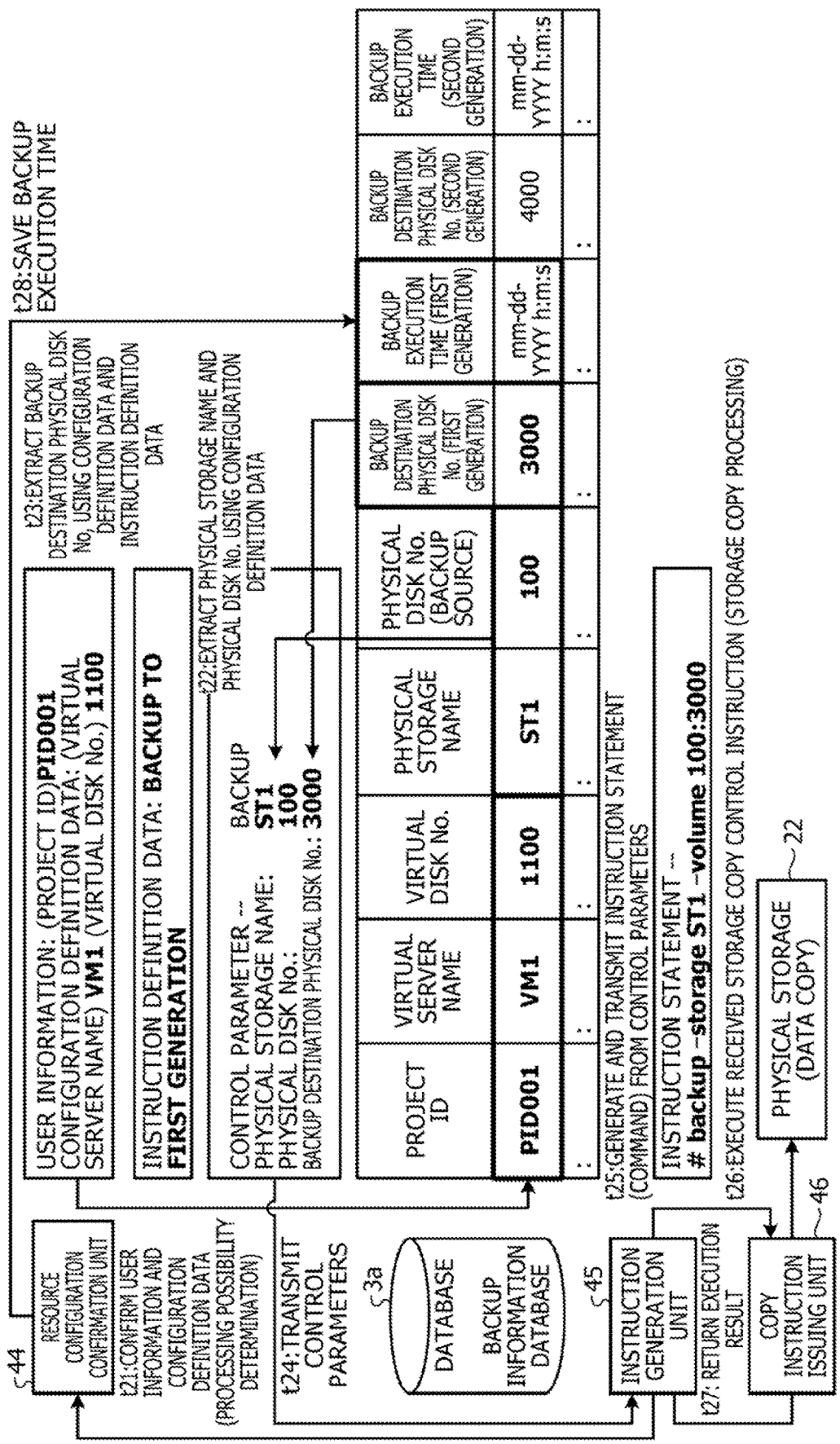
FIG. 7C is a diagram illustrating a backup operation by the backup control unit.

FIG. 7C is a diagram illustrating a backup operation by the backup control unit 34. In FIG. 7C, the project ID is "PID001", the virtual server name is "VM1", the virtual disk No. is "1100", and the instruction definition data are "backup" and "first generation".

As illustrated in FIG. 7C, the resource configuration confirmation unit 44 confirms user information and configuration definition data (t21). The resource configuration confirmation unit 44 determines whether the backup processing is possible by determining whether the user information (project ID) and the configuration definition data (virtual server name and virtual disk No.) are associated with the backup information database. In FIG. 7C, since the project ID "PID001" is associated with the virtual server name "VM1" and the virtual disk No. "1100" In the backup information database, it is determined that the backup processing is possible.

Then, the resource configuration confirmation unit 44 creates the control parameters on the basis of the configuration definition data, the instruction definition data, and the backup information database. In creating the control parameters, the resource configuration confirmation unit 44 extracts the physical storage name and the physical disk No. from the backup information database using the configuration definition data (t22). In addition, the resource configuration confirmation unit 44 extracts the backup destination physical disk No. from the backup information database using the configuration definition data and the instruction definition data (t23). In FIG. 7C, "Sri" is extracted as the physical storage name, "100" is extracted as the physical disk No., and "3000" is extracted as the backup destination physical disk No. Then, the resource configuration confirmation unit 44 transmits the control parameters to the instruction generation unit 45 (t24).

The instruction generation unit 45 generates an instruction statement for copy from the control parameters and transmits the instruction statement to the copy instruction issuing unit 46 (t25). In FIG. 7C, "#backup-storage ST1-volume 100: 3000" is generated and sent. The copy instruction issuing unit 46 creates the storage copy control instruction on the basis of the instruction statement and transmits the storage copy control instruction to the physical storage 22.

The physical storage 22 receives the storage copy control instruction and executes the received storage copy control instruction (t26). Then, the copy instruction issuing unit 46 returns the execution result to the instruction generation unit 45 (t27). The instruction generation unit 45 returns the execution result to the resource configuration confirmation unit 44. Then, the resource configuration confirmation unit 44 stores the backup execution time in the backup information database (t28).

Figure 7D:
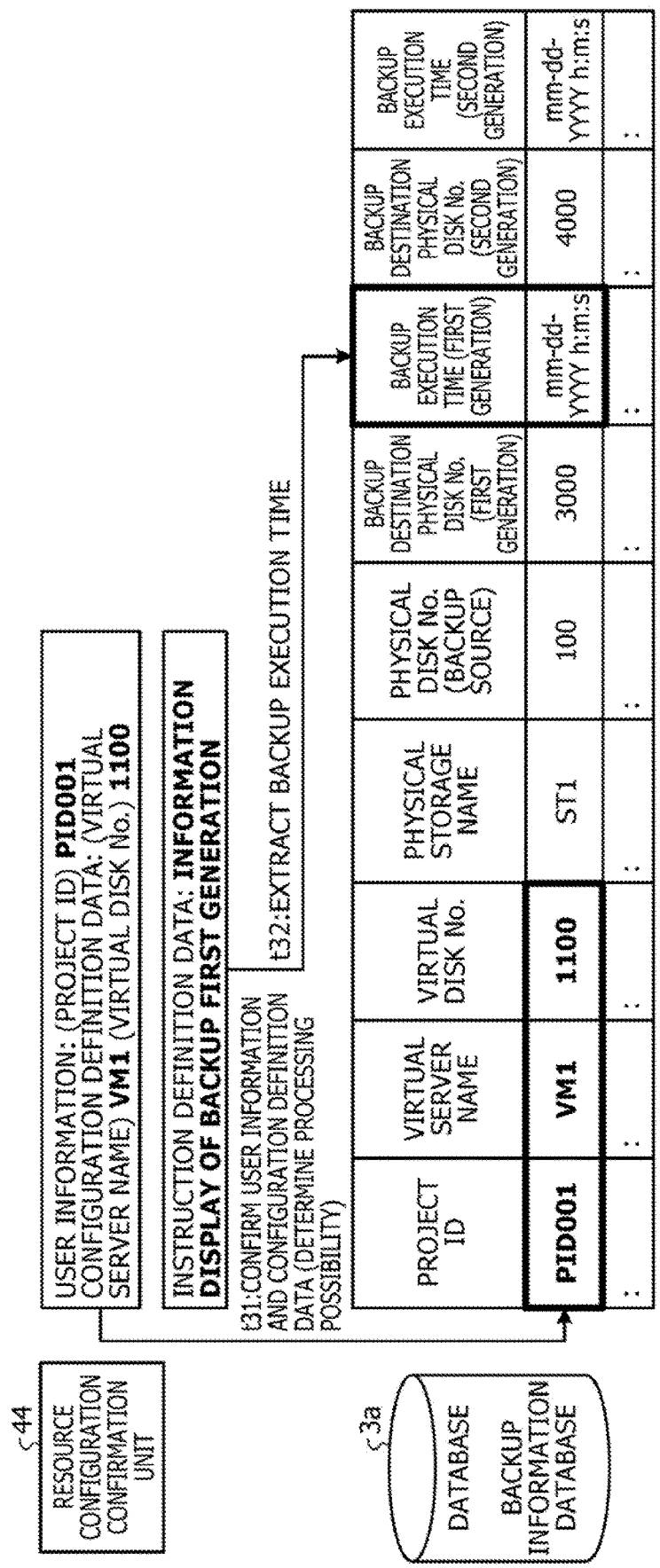
FIG. 7D is a diagram illustrating an information display operation by the backup control unit.

FIG. 7D is a diagram illustrating an information display operation by the backup control unit 34. In FIG. 7D, the project ID is "PID001", the virtual server name is "VM1", the virtual disk No. is "1100", and the instruction definition data are "information display" and "first generation". As illustrated in FIG. 7D, the resource configuration confirmation unit 44 confirms the user information and the configuration definition data (t31). Then, the resource configuration confirmation unit 44 extracts the backup execution time (first generation) from the backup information database (t32) and transmits the backup execution time to the user via the interface unit 41.

Figure 8:
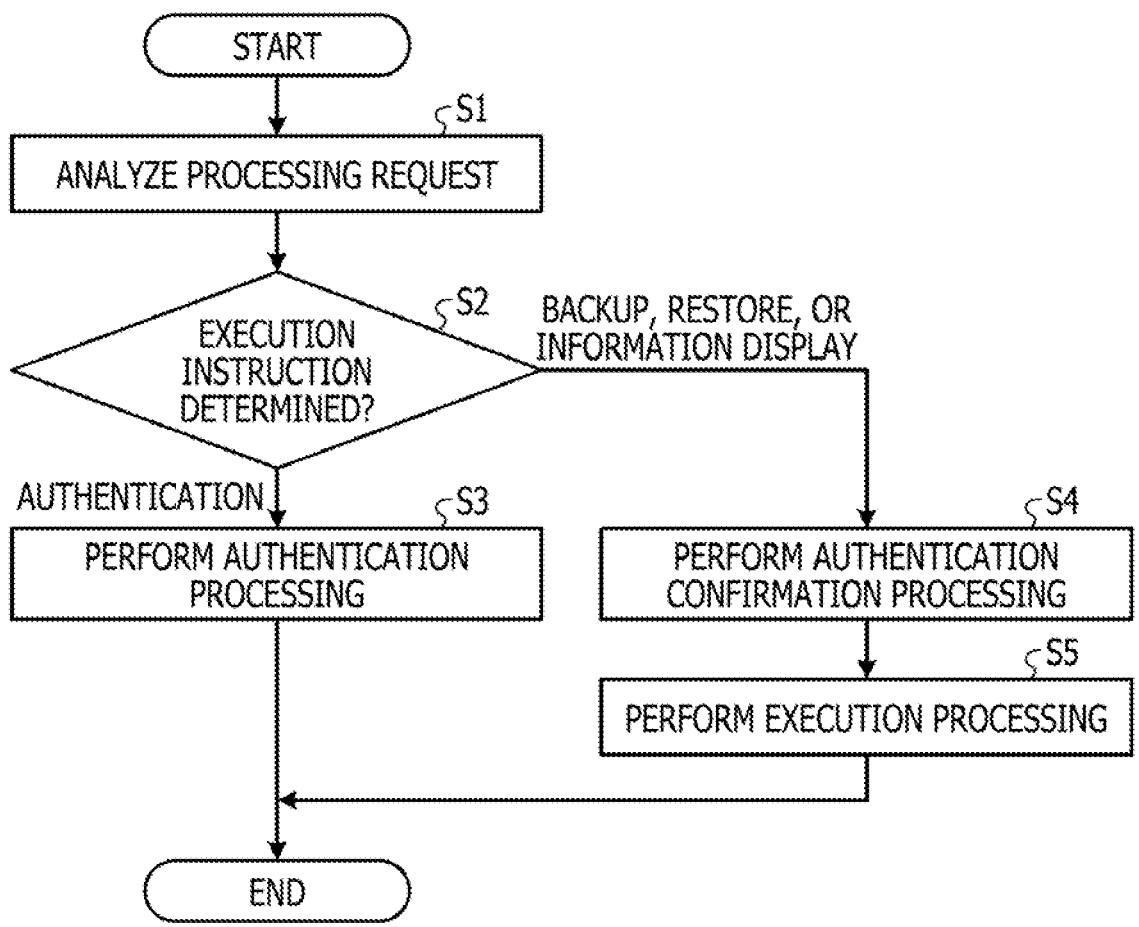
FIG. 8 is a flowchart illustrating a flow of processing by the backup control unit.

Next, a flow of processing performed by the backup control unit 34 will be described with reference to FIGS. 8 to 12. FIG. 8 is a flowchart illustrating a flow of processing by the backup control unit 34. As illustrated in FIG. 8, the backup control unit 34 receives the processing request from the user and analyzes the received processing request (step S1). Then, the backup control unit 34 determines the execution instruction (step S2), and performs the authentication processing for the user in the case where the execution instruction is the authentication (step S3). Meanwhile, in the case where the execution instruction is the backup, restore, or information display, the backup control unit 34 performs the authentication confirmation processing for the execution instruction (step S4) and performs execution processing (step S5).

Figure 9:
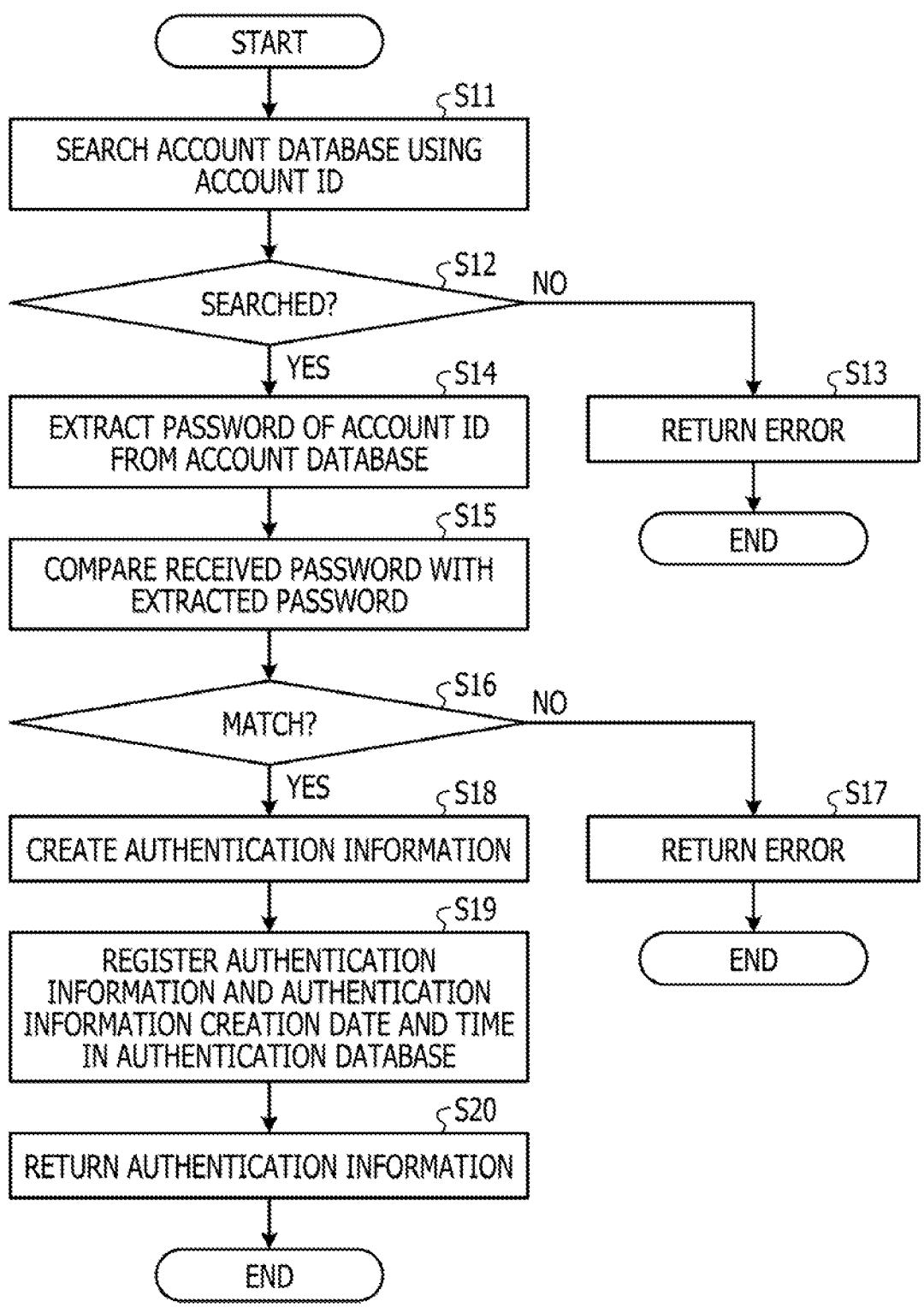
FIG. 9 is a flowchart illustrating a flow of authentication processing.

FIG. 9 is a flowchart illustrating a flow of the authentication processing. As illustrated in FIG. 9, the backup control unit 34 searches the account database using the account ID (step S11) and determines whether the account ID has been searched (step S12). Then, in a case where the account ID has not been searched, the backup control unit 34 returns an error to the user (step S13).

On the other hand, in a case where the account ID has been searched, the backup control unit 34 extracts the password of the account ID from the account database (step S14) and compares the received password with the extracted password (step S15). Then, the backup control unit 34 determines whether or not the received password and the extracted password match (step S16) and returns an error to the user in a case where the passwords do not match (step S17).

On the other hand, in a case where the received password and the extracted password match, the backup control unit 34 creates the authentication information (step S18) and registers the authentication information and the authentication information creation date and time in the authentication database (step S19). Then, the backup control unit 34 returns the authentication information to the user (step S20).

In this way, the backup control unit 34 registers the authentication information and the authentication information creation date and time in the authentication database, so that authentication confirmation can be performed when the backup, restore, or information display is requested.

Figure 10:
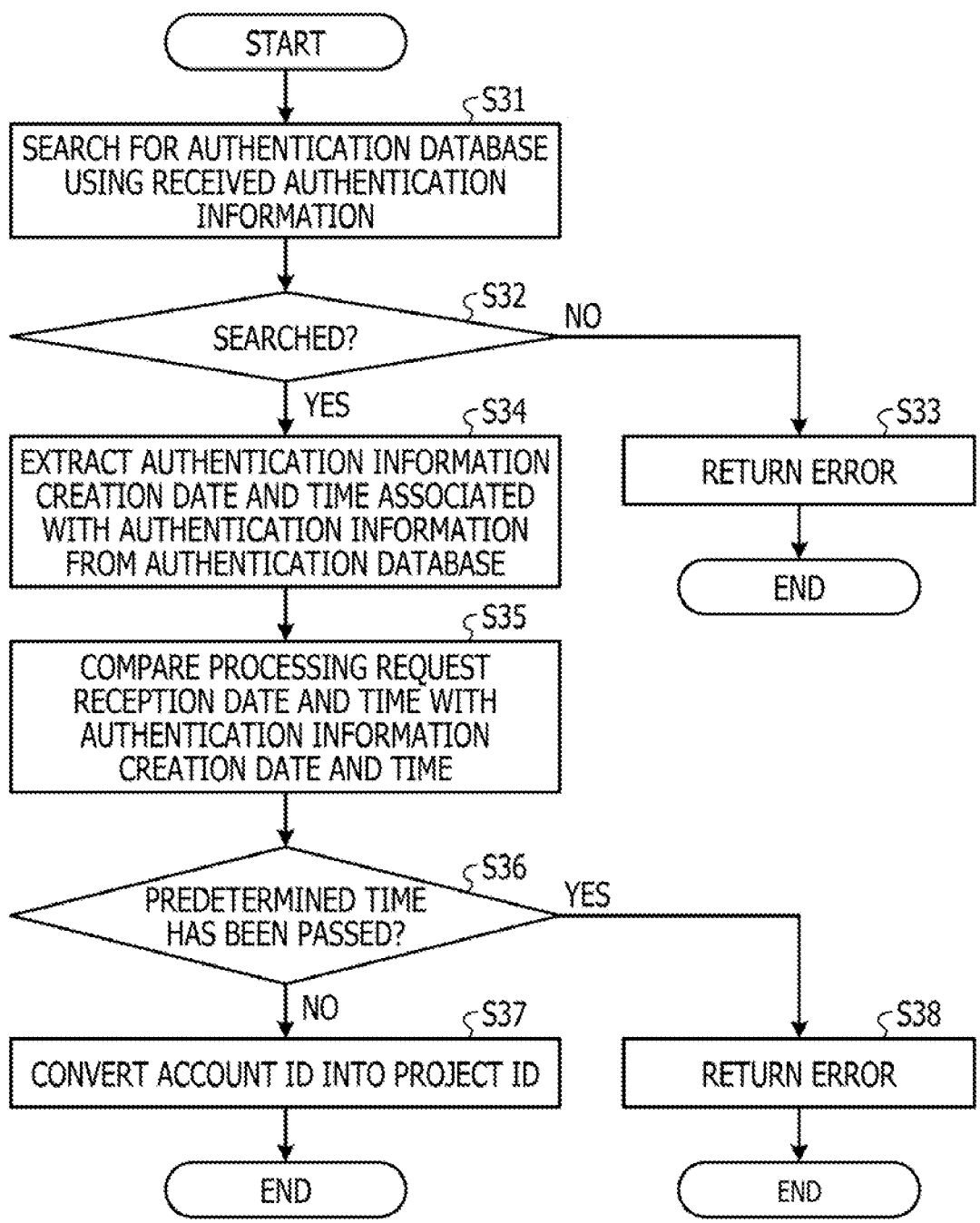
FIG. 10 is a flowchart illustrating a flow of authentication confirmation processing.

FIG. 10 is a flowchart illustrating a flow of the authentication confirmation processing. As illustrated in FIG. 10, the backup control unit 34 searches the authentication database using the received authentication information (step S31) and determines whether the received authentication information has been searched (step S32). Then, in a case where the authentication information has not been searched, the backup control unit 34 returns an error to the user (step S33).

On the other hand, in a case where the received authentication information has been searched, the backup control unit 34 extracts the authentication information creation date and time associated with the authentication information from the authentication database (step S34) and compares the processing request reception date and time and the authentication information creation date and time (step S35). Then, the backup control unit 34 determines whether the processing request reception date and time has passed a predetermined time or more from the authentication information creation date and time (step S36) and converts the account ID into the project ID in a case where the predetermined time or more has not been passed (step S37). On the other hand, in a case where the processing request reception date and time has passed the predetermined time or more from the authentication information creation date and time, the backup control unit 34 returns an error to the user (step S38).

In this way, the backup control unit 34 returns an error to the user in the case where the processing request reception date and time has passed the predetermined time or more from the authentication information creation date and time, so that the security for the execution request can be improved.

Figure 11:
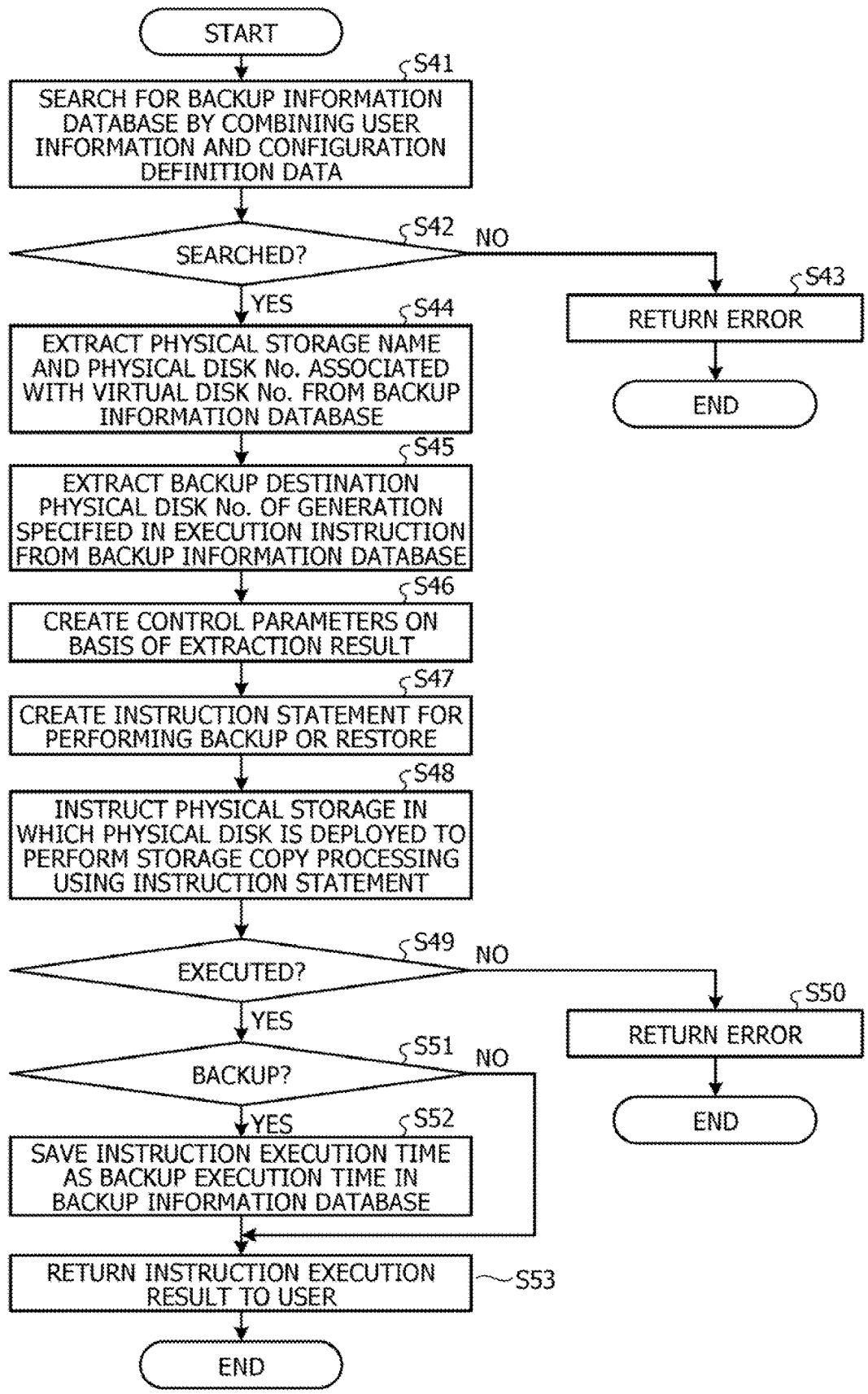
FIG. 11 is a flowchart illustrating a flow of execution processing in a case where an execution instruction is backup or restore.

FIG. 11 is a flowchart illustrating a flow of the execution processing in the case where the execution instruction is the backup or restore. As illustrated in FIG. 11, the backup control unit 34 searches the backup information database by combining the user information and the configuration definition data (step S41). Then, the backup control unit 34 determines whether or not the combination of the user information and the configuration definition data has been searched (step S42) and returns an error to the user in a case of not searched (step S43).

On the other hand, in a case where the combination of the user information and the configuration definition data has been searched, the backup control unit 34 extracts the physical storage name and the physical disk No. associated with the virtual disk No. from the backup information database (step S44). Furthermore, the backup control unit 34 extracts the backup destination physical disk No. of the generation specified by the execution instruction from the backup information database (step S45).

Then, the backup control unit 34 creates the control parameters on the basis of the extraction result (step S46) and creates the instruction statement for executing the backup or restore (step S47). Then, the backup control unit 34 instructs the physical storage 22 in which the physical disk 23 is deployed to perform storage copy processing using the instruction statement (step S48) and determines whether or not the storage copy processing has been executed as instructed (step S49). Then, in a case where the storage copy processing as instructed has not been executed, the backup control unit 34 returns an error to the user (step S50).

On the other hand, in a case where the storage copy processing has been executed as instructed, the backup control unit 34 determines whether or not the execution instruction is the backup (step S51). Then, in the case of the backup, the backup control unit 34 stores the instruction execution time as the backup execution time in the backup information database (step S52) and returns the instruction execution result to the user (step S53).

In this way, the backup control unit 34 can execute the backup or restore by instructing the physical storage 22 to perform the storage copy processing for performing the backup or restore on the basis of the backup information database.

Figure 12:
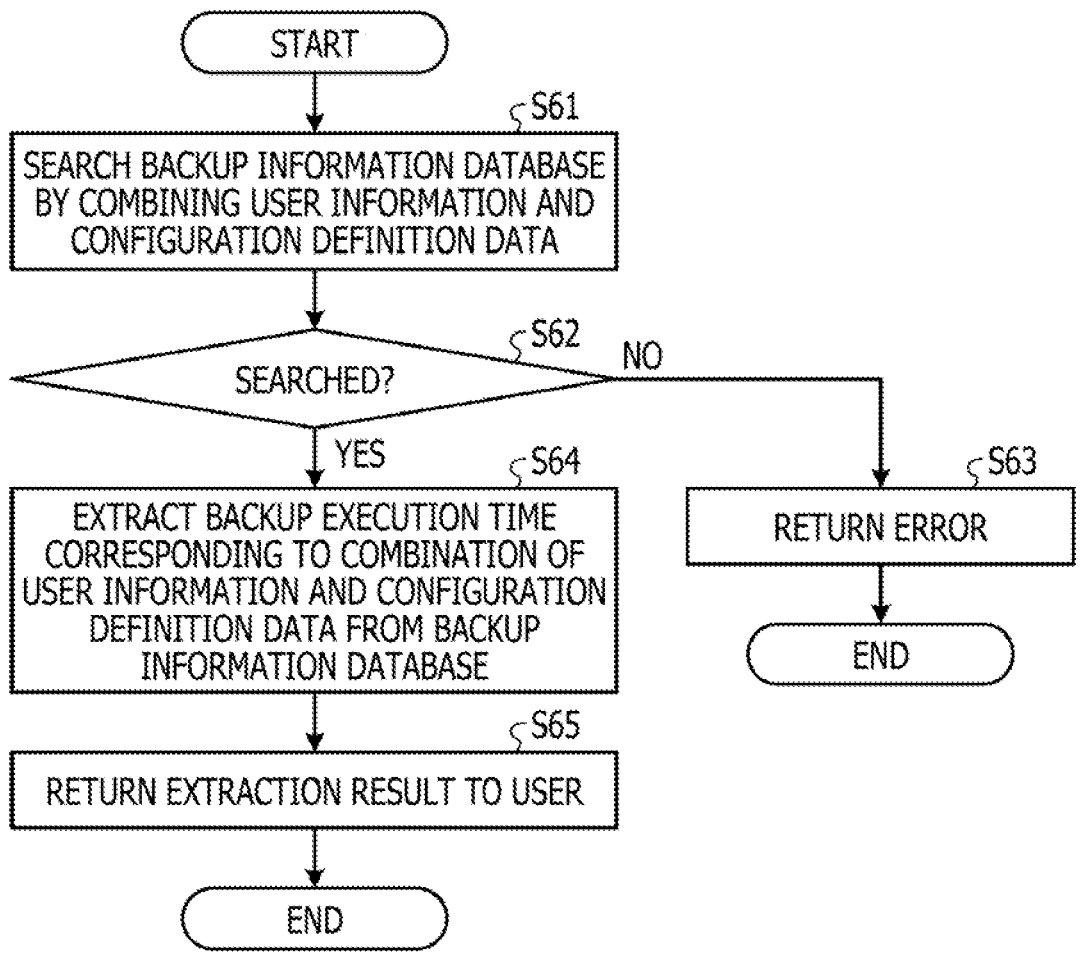
FIG. 12 is a flowchart illustrating a flow of execution processing in a case where the execution instruction is information display.

FIG. 12 is a flowchart illustrating a flow of execution processing in a case where the execution instruction is information display. As illustrated in FIG. 12, the backup control unit 34 searches the backup information database by combining the user information and the configuration definition data (step S61). Then, the backup control unit 34 determines whether the combination of the user information and the configuration definition data has been searched (step S62) and returns an error to the user in the case of not being searched (step S63).

On the other hand, in the case where the combination of the user information and the configuration definition data has been searched, the backup control unit 34 extracts the backup execution time corresponding to the combination of the user information and the configuration definition data from the backup information database (step S64). Then, the backup control unit 34 returns the extraction result to the user (step S65).

In this way, the backup control unit 34 can provide the user with information regarding the backup by searching the backup information database.

Figure 13A:
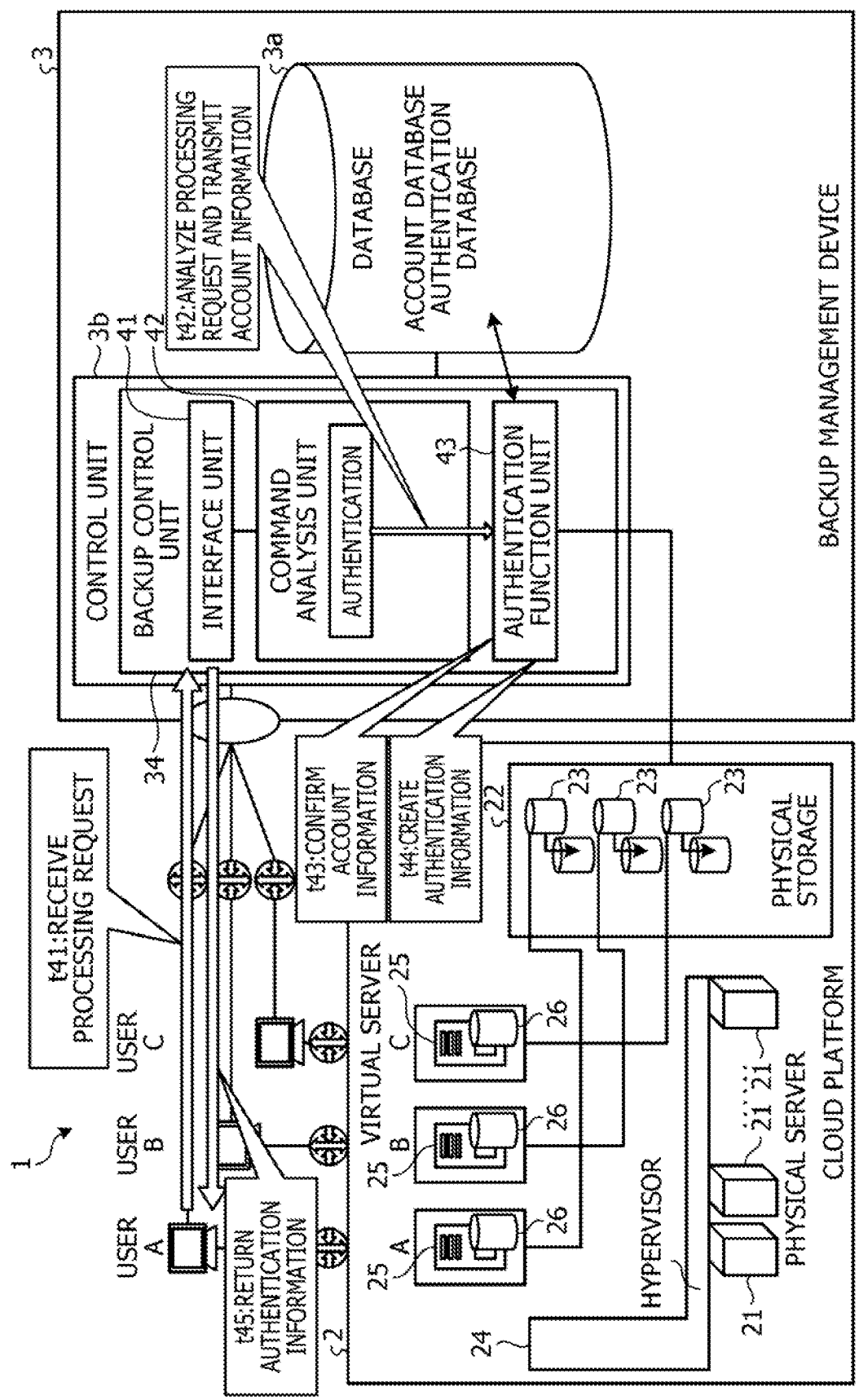
FIG. 13A is a diagram illustrating a flow of processing in a case where the execution instruction is authentication.

Next, a flow of the processing by the backup control unit 34 will be described with reference to FIGS. 13A to 13C. FIG. 13A is a diagram illustrating a flow of the processing in the case where the execution instruction is the authentication. As illustrated in FIG. 13A, the interface unit 41 receives the processing request from the user (t41). Then, the command analysis unit 42 analyzes the processing request, and transmits the account information to the authentication function unit 43 because the execution instruction is the authentication (t42). The authentication function unit 43 refers to the account database and confirms the account information (t43), and creates the authentication information when confirming the account information (t44). Then, the authentication function unit 43 stores the authentication information in the authentication database and returns the authentication information to the user via the interface unit 41 (t45).

Figure 13B:
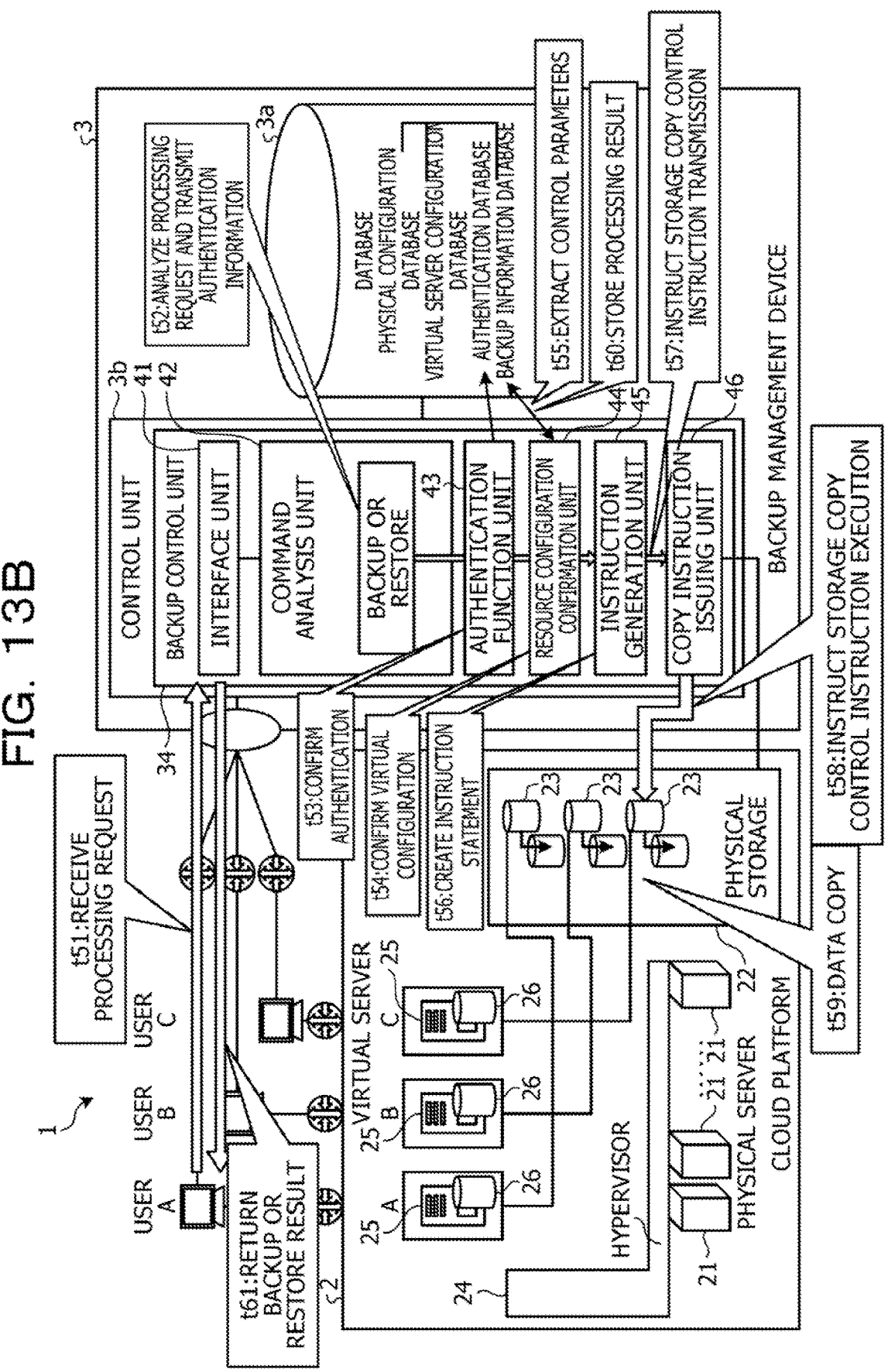
FIG. 13B is a diagram illustrating a flow of processing in a case where the execution instruction is backup or restore.

FIG. 13B is a diagram illustrating a flow of the processing in the case where the execution instruction is the backup or restore. As illustrated in FIG. 13B, the interface unit 41 receives the processing request from the user (t51). Then, the command analysis unit 42 analyzes the processing request and transmits the authentication information to the authentication function unit 43 because the execution instruction is the backup or restore (t52). The authentication function unit 43 refers to the authentication database and performs authentication confirmation (t53). Then, the resource configuration confirmation unit 44 refers to the backup information database and performs virtual configuration confirmation (t54), and extracts the control parameters from the backup information database (t55).

Then, the instruction generation unit 45 creates the instruction statement for backup on the basis of the control parameters (t56) and instructs the copy instruction issuing unit 46 to transmit the storage copy control instruction (t57). The copy instruction issuing unit 46 instructs the physical storage 22 to execute the storage copy control instruction (t58). The physical storage 22 executes data copy (t59) and notifies the backup management device 3 of the execution result. The resource configuration confirmation unit 44 stores the processing result in the backup information database (t60) and returns the backup or restore result to the user via the interface unit 41 (t61).

Figure 13C:
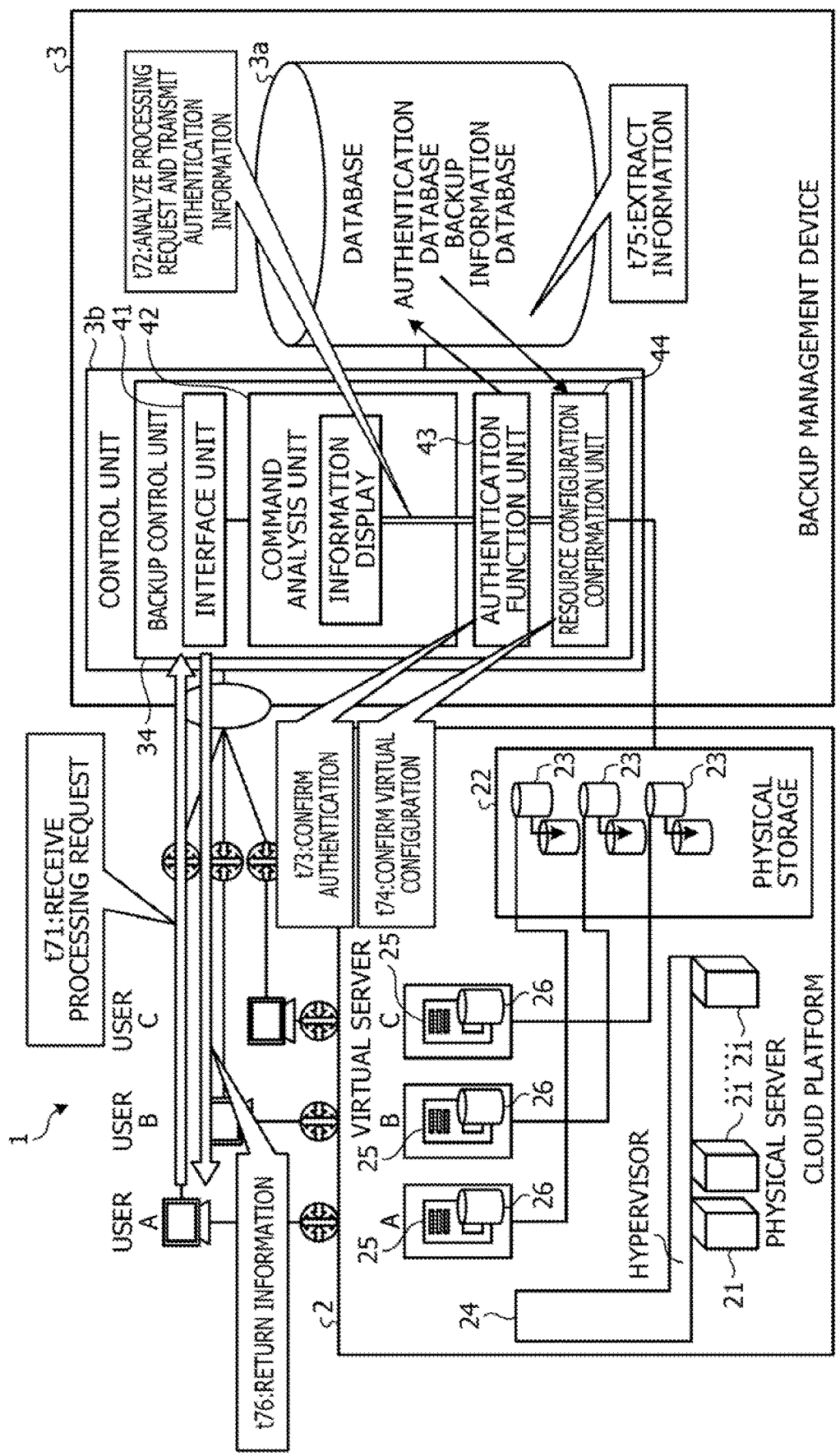
FIG. 13C is a diagram illustrating a flow of processing in a case where the execution instruction is information display.

FIG. 13C is a diagram illustrating a flow of processing in a case where the execution instruction is information display. As illustrated in FIG. 13C, the interface unit 41 receives the processing request from the user (t71). Then, the command analysis unit 42 analyzes the processing request and transmits the authentication information to the authentication function unit 43 because the execution instruction is the information display (t72). The authentication function unit 43 refers to the authentication database and performs the authentication confirmation (t73). Then, the resource configuration confirmation unit 44 refers to the backup information database and performs virtual configuration confirmation (t74). Then, the resource configuration confirmation unit 44 extracts information from the backup information database (t75) and returns the extracted information to the user via the interface unit 41 (t76).

As described above, in the embodiment, the database 3a stores the physical storage data and the virtual server data. Then, the backup information generation unit 33 generates the backup information data from the physical storage data and the virtual server data at the timing when the virtual server 25 is provided to the user. Then, the backup control unit 34 performs the backup of the virtual disk 26 by copying the physical disk 23 associated with the virtual disk 26 to the backup destination physical disk 23 using the backup information data. Therefore, the backup management device 3 can remove the copy of the virtual disk 26 by the hypervisor 24 in the backup of the virtual disk 26 and prevent performance deterioration of other virtual resources.

Furthermore, in the embodiment, when the user is successfully authenticated, the authentication function unit 43 creates the token with a random number of alphanumeric characters and symbols. Then, the authentication function unit 43 performs the authentication confirmation for the backup request on the basis of whether the reception date and time of the backup request has passed a predetermined time or more from the creation date and time of the token. Then, when the authentication confirmation for the backup request has been performed, the backup control unit 34 performs the backup of the virtual disk 26. Therefore, the backup management device 3 can ensure the security of the backup in the cloud platform 2 used by a plurality of users.

Furthermore, in the embodiment, the authentication function unit 43 stores the created token and the creation date and time of the token with the account ID in association with one another in the authentication database, and returns the associated information to the user. Then, when receiving the backup request from the user together with the token, the authentication function unit 43 acquires the creation date and time of the token from the authentication database and compares the acquired creation date and time with the reception date and time of the backup request. Then, the authentication function unit 43 performs the authentication confirmation for the backup request on the basis of whether the reception date and time of the backup request has passed a predetermined time from the creation date and time of the token. Therefore, the backup management device 3 can appropriately confirm the validity of the backup request.

Furthermore, in the embodiment, the backup information generation unit 33 generates the backup information data in which the virtual disk No. and the physical disk No. are associated with the project ID. Then, the command analysis unit 42 converts the account ID into the project ID when the authentication confirmation for the backup request has been performed. Therefore, the backup management device 3 can accurately associate the user with the backup information data.

Furthermore, in the embodiment, the backup information generation unit 33 generates the backup information data including the project ID, the virtual server name, the virtual disk No., the physical storage name, the physical disk No., the backup destination physical disk No., and the backup execution time. Therefore, the backup management device 3 can control the backup of the virtual disk 26 based on the backup information data.

Note that, in the embodiment, the backup management device 3 has been described. However, by implementing the configuration of the backup management device 3 by software, it is possible to obtain a backup management program that has a similar function. Therefore, a computer that executes the backup management program will be described.

Figure 14:
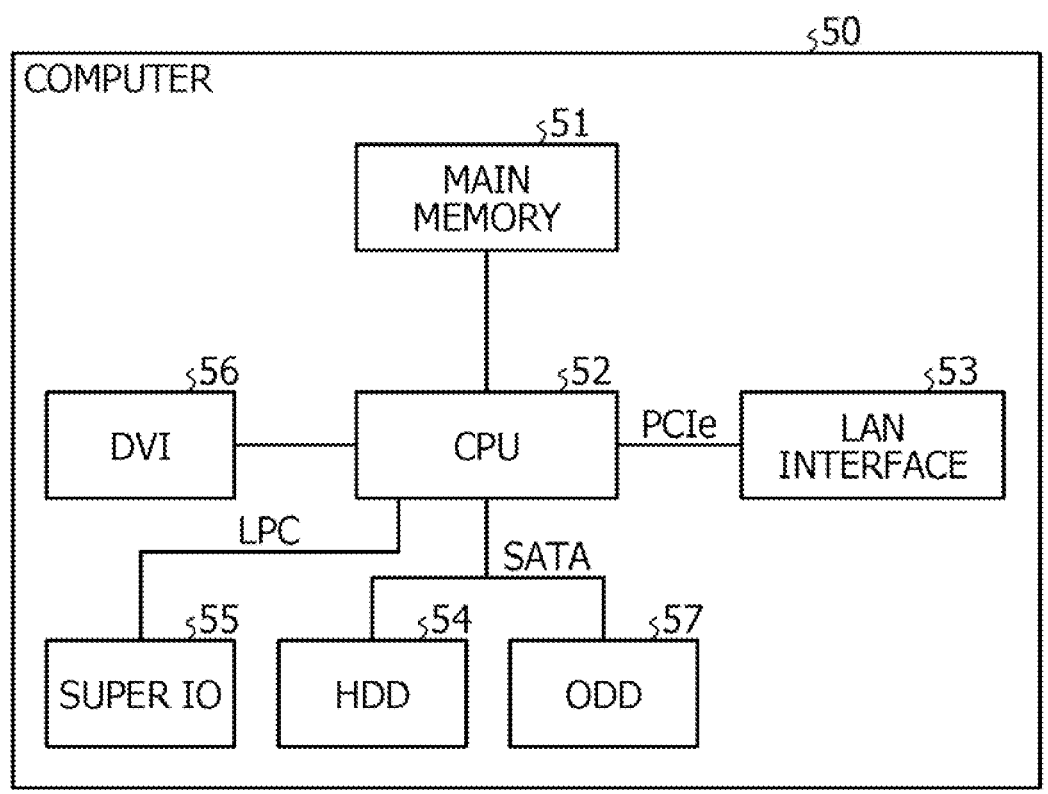
FIG. 14 is a diagram illustrating a hardware configuration of a computer that executes a backup management program according to an embodiment.
Figure 15:
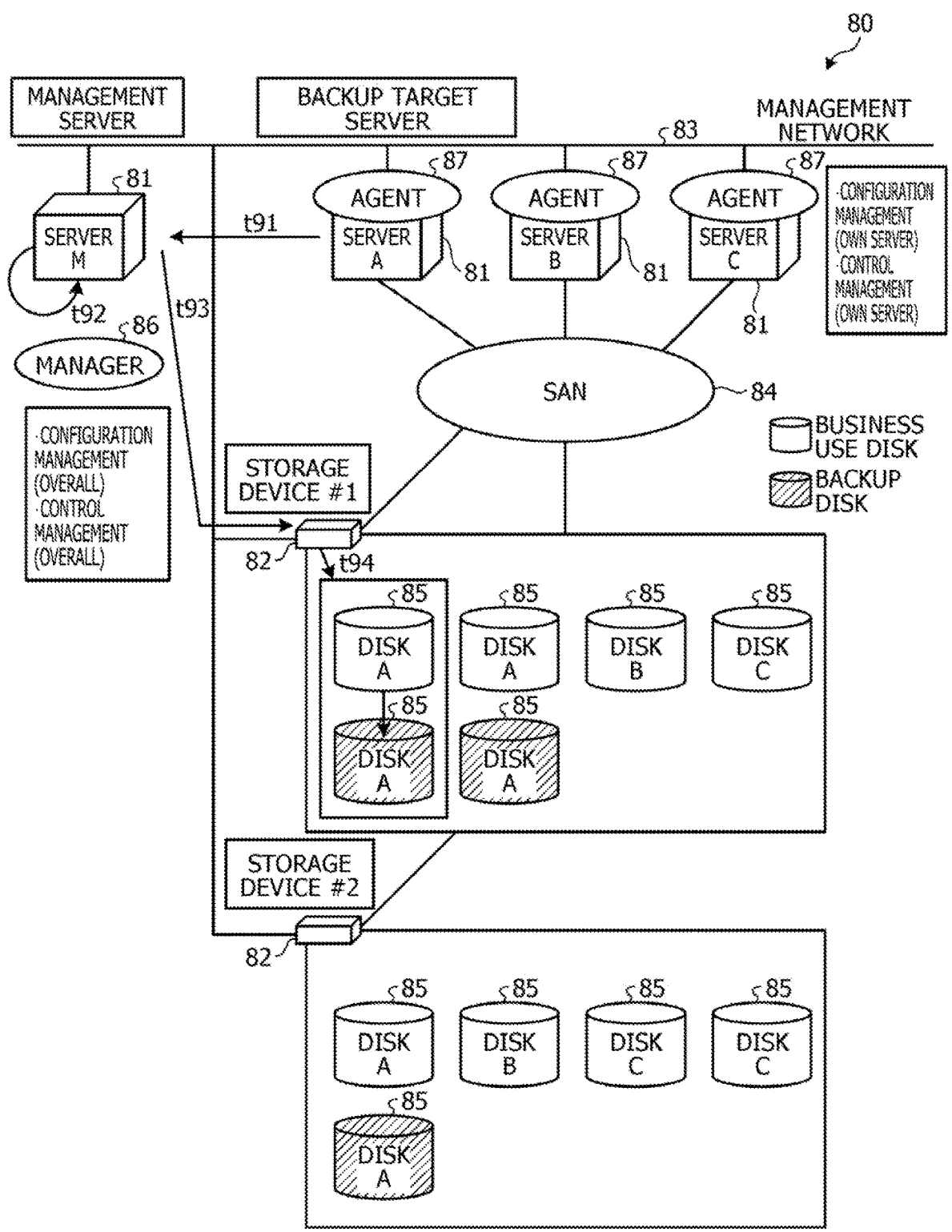
FIG. 15 is a diagram illustrating a backup system that backs up data in a storage device connected to a server.

FIG. 14 is a diagram illustrating a hardware configuration of a computer that executes a backup management program according to an embodiment. As illustrated in FIG. 14, a computer 50 includes a main memory 51, a CPU 52, a local area network (LAN) interface 53, and a hard disk drive (HDD) 54. Furthermore, the computer 50 includes a super input output (10) 55, a digital visual interface (DVI) 56, and an optical disk drive (ODD) 57.

The main memory 51s a memory that stores a program, a halfway result of execution of the program, and the like. The CPU 52 is a central processing unit that reads and executes the program from the main memory 51. The CPU 52 includes a chipset having a memory controller.

The LAN interface 53 is an interface for connecting the computer 50 to another computer by way of a LAN. The HDD 54 is a disk device that stores programs and data, and the super IO 55 is an interface for connecting an input device such as a mouse and a keyboard. The DVI 56 is an interface that connects a liquid crystal display device, and the ODD 57 is a device that reads and writes data from and to a digital versatile disc (DVD).

The LAN interface 53 is connected to the CPU 52 by peripheral component interconnect express (PCIe), and the HDD 54 and the ODD 57 are connected to the CPU 52 by serial advanced technology attachment (SATA). The super IO 55 is connected to the CPU 52 by low pin count (LPC).

Then, the backup management program executed by the computer 50 is stored in a DVD that is an example of a recording medium that can be read by the computer 50, and is read from the DVD by the ODD 57 to be installed to the computer 50. Alternatively, the backup management program is stored in a database or the like of another computer system connected via the LAN interface 53 and is read from these databases and is installed to the computer 50. Then, the installed backup management program is stored in the HDD 54, is read to the main memory 51, and is executed by the CPU 52.

Note that, the function of the backup management device 3 can also be implemented using a plurality of computers and a plurality of virtual servers. For example, the function of the interface unit 41 is implemented using a web server, the function of the control unit 3b excluding the interface unit 41 is implemented using an application server, and the function to manage the database 3a is implemented using a database server.

Furthermore, in the embodiment, the case where the physical disk 23 is backed up to the same physical storage 22 has been described, but the information processing system 1 may back up the physical disk 23 to another physical storage 22. Furthermore, in the embodiment, the case where the physical disk 23 and the virtual disk 26 are targeted has been described, but the backup management device 3 may perform backup of another physical storage device instead of the physical disk 23 and another virtual storage device instead of the virtual disk 26.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A backup management device comprising:
   a database configured to store configuration information of physical resource including a physical storage device, configuration information of virtual resource including a virtual storage device, and relationship information of the virtual resource and the physical resource; and
   a processor configured to:
      generate, when the virtual storage device is provided to a user, backup information related to backup control of the physical storage device associated with the virtual storage device based on information stored in the database,
      perform backup of the virtual storage device by copying a physical storage device associated with the virtual storage device to another physical storage device based on the generated backup information,
      authenticate the user, generate temporary authentication information using a random number of alphanumeric characters and symbols when the user is successfully authenticated,
      perform authentication confirmation for a request of the backup based on whether the request has been received together with the temporary authentication information before a predetermined time has passed since the temporary authentication information has been generated, and
      perform the backup when the authentication confirmation for the request is performed.

2. The backup management device according to claim 1, wherein the processor is further configured to: store user identification information that identifies the user, the temporary authentication information, and generation date and time of the temporary authentication information in the database in association with one another, and transmit the user identification information, the temporary authentication information, and the generation date and time of the temporary authentication information to a terminal of the user, when receiving the request of the backup together with the temporary authentication information from the terminal of the user, acquires the generation date and time associated with the temporary authentication information from the database, compares the acquired generation date and time with date and time when receiving the request of the backup, and perform the authentication confirmation regarding the request of the backup on the basis of whether or not the date and time when receiving the request of the backup has passed the predetermined time from the generation date and time.

3. The backup management device according to claim 2, wherein the processor is further configured to: generate backup information in which information of the virtual storage device and the physical storage device is associated with a project identifier that identifies a project of the user, convert the user identification information into the project identifier when the authentication function unit performs the authentication confirmation using the temporary authentication information, and perform the backup using the project identifier.

4. The backup management device according to claim 3, wherein the backup information includes the project identifier, a virtual storage device identifier that identifies the virtual storage device, and a backup destination physical storage device identifier that identifies the physical storage device of backup destination.

5. A backup management method comprising:
    storing, in a database, configuration information of physical resource including a physical storage device, configuration information of virtual resource including a virtual storage device, and relationship information of the virtual resource and the physical resource;
    generating, when the virtual storage device is provided to a user, backup information related to backup control of the physical storage device associated with the virtual storage device based on information stored in the database; and
    performing backup of the virtual storage device by copying a physical storage device associated with the virtual storage device to another physical storage device based on the generated backup information;
    authenticating the user, generate temporary authentication information using a random number of alphanumeric characters and symbols when the user is successfully authenticated;
    performing authentication confirmation for a request of the backup based on whether the request has been received together with the temporary authentication information before a predetermined time has passed since the temporary authentication information has been generated; and
    performing the backup when the authentication confirmation for the request is performed.

6. An information processing system:
    a cloud platform configured to provide with a user a virtual resource including a virtual storage device which virtualizes physical resource including physical storage device; and
    a backup management device configured to manage a backup of the virtual storage device, the backup management device is further includes:
        a database configured to store configuration information of the physical resource, configuration information of the virtual resource, and relationship information of the virtual resource and the physical resource, and
        a processor configured to:
            generate, when the virtual storage device is provided to a user, backup information related to backup control of the physical storage device associated with the virtual storage device based on information stored in the database, and
            perform backup of the virtual storage device by copying a physical storage device associated with the virtual storage device to another physical storage device based on the generated backup information,
            authenticate the user, generate temporary authentication information using a random number of alphanumeric characters and symbols when the user is successfully authenticated,
            perform authentication confirmation for a request of the backup based on whether the request has been received together with the temporary authentication information before a predetermined time has passed since the temporary authentication information has been generated, and
            perform the backup when the authentication confirmation for the request is performed.

* * * * *